(12) United States Patent
Chen et al.

(10) Patent No.: US 11,157,340 B2
(45) Date of Patent: Oct. 26, 2021

(54) MOBILE APPLICATION SERVICE ENGINE (MASE)

(71) Applicant: Relay2, Inc., Milpitas, CA (US)

(72) Inventors: Jihn-Shiarn Chen, Fremont, CA (US); Wai-Tak Siu, San Jose, CA (US); Wei Lu, Beijing (CN)

(73) Assignee: Relay2, Inc., Milpitas, CA (US)

( * ) Notice: Subject to any disclaimer, the term of this patent is extended or adjusted under 35 U.S.C. 154(b) by 0 days.

(21) Appl. No.: 16/654,836

(22) Filed: Oct. 16, 2019

(65) Prior Publication Data
US 2020/0285529 A1 Sep. 10, 2020

Related U.S. Application Data

(63) Continuation of application No. 15/789,904, filed on Oct. 20, 2017, now abandoned, and a (Continued)

(51) Int. Cl.
G06F 9/54 (2006.01)
G06F 16/182 (2019.01)
H04W 24/02 (2009.01)
H04L 29/08 (2006.01)
G06F 8/61 (2018.01)
H04W 4/50 (2018.01)
G06F 11/30 (2006.01)
H04W 88/08 (2009.01)
H04L 12/24 (2006.01)

(52) U.S. Cl.
CPC ............ G06F 9/547 (2013.01); G06F 8/61 (2013.01); G06F 11/3003 (2013.01); G06F 11/3051 (2013.01); G06F 11/3089 (2013.01); G06F 16/183 (2019.01); H04L 67/02 (2013.01); H04L 67/10 (2013.01); H04L 67/34 (2013.01); H04W 4/50 (2018.02); H04W 24/02 (2013.01); H04L 41/046 (2013.01); H04L 41/0803 (2013.01); H04L 67/20 (2013.01); H04W 88/08 (2013.01)

(58) Field of Classification Search
None
See application file for complete search history.

(56) References Cited

U.S. PATENT DOCUMENTS 8,259,635 B2 9/2012 Thubert et al.
8,638,731 B2 1/2014 Venkatachalam
(Continued)

FOREIGN PATENT DOCUMENTS

EP 2785103 10/2014
WO 2014155044 10/2014
WO 2014191048 12/2014

OTHER PUBLICATIONS

International Application No. PCT/US2016/061196, International Search Report and Written Opinion dated Jan. 31, 2017.
(Continued)

Primary Examiner — Qing Chen
(74) Attorney, Agent, or Firm — Sheppard, Mullin, Richter & Hampton LLP

(57) ABSTRACT

Third party applications are deployed as "containerized applications" on one or more wireless AP devices. The containerized applications are confined to a pre-allocated segregated disk space within a file system of a wireless AP device. The containerized applications have access to standard Linux services as well as access to advanced features provided by an AP.

16 Claims, 22 Drawing Sheets

Related U.S. Application Data continuation-in-part of application No. 14/938,763, filed on Nov. 11, 2015, now abandoned, and a continuation-in-part of application No. 14/749,580, filed on Jun. 24, 2015, now abandoned, and a continuation-in-part of application No. 14/886,636, filed on Oct. 19, 2015, now abandoned.

(56) References Cited

U.S. PATENT DOCUMENTS

| | | |
|---|---|---|
| 8,902,777 B1 | 12/2014 | Huang |
| 8,942,717 B2 | 1/2015 | Yao et al. |
| 2005/0083895 A1 | 4/2005 | Pinault |
| 2005/0153667 A1 | 7/2005 | Cave et al. |
| 2005/0239497 A1 | 10/2005 | Bahl et al. |
| 2007/0217377 A1 | 9/2007 | Takeuchi |
| 2007/0282951 A1 | 12/2007 | Selimis |
| 2008/0192692 A1 | 8/2008 | Chari et al. |
| 2008/0240056 A1 | 10/2008 | Behroozi et al. |
| 2009/0059873 A1 | 3/2009 | Weil et al. |
| 2009/0201898 A1 | 8/2009 | Gong et al. |
| 2010/0296494 A1 | 11/2010 | Kanodia et al. |
| 2011/0026473 A1 | 2/2011 | Luo et al. |
| 2011/0162060 A1 | 6/2011 | Vijayakumar et al. |
| 2011/0296046 A1 | 12/2011 | Arya |
| 2012/0170455 A1 | 7/2012 | Iyer et al. |
| 2013/0022024 A1 | 1/2013 | Chu et al. |
| 2014/0057652 A1 | 2/2014 | Palanki et al. |
| 2014/0059218 A1 | 2/2014 | Ganu et al. |
| 2014/0109072 A1 | 4/2014 | Lang |
| 2014/0148129 A1 | 5/2014 | Lundstrom |
| 2014/0317276 A1 | 10/2014 | Tie |
| 2014/0323087 A1 | 10/2014 | Huang et al. |
| 2014/0334336 A1 | 11/2014 | Chen et al. |
| 2014/0369217 A1 | 12/2014 | Kim et al. |
| 2015/0036488 A1 | 2/2015 | Mettu et al. |
| 2015/0071061 A1 | 3/2015 | Sahu et al. |
| 2015/0085746 A1 | 3/2015 | Somayazulu et al. |
| 2015/0208426 A1 | 7/2015 | Jetcheva et al. |
| 2015/0271829 A1 | 9/2015 | Amini et al. |
| 2015/0334598 A1 | 11/2015 | Duo et al. |
| 2016/0028604 A1 | 1/2016 | Chakrabarti et al. |
| 2016/0036572 A1 | 2/2016 | Bhanage et al. |
| 2016/0066227 A1 | 3/2016 | Townend |
| 2016/0205539 A1 | 7/2016 | Liu |
| 2016/0241702 A1 | 8/2016 | Gorajala Chandra et al. |
| 2016/0373330 A1 | 12/2016 | Pace et al. |
| 2016/0374012 A1 | 12/2016 | Prechner et al. |
| 2016/0381655 A1 | 12/2016 | Kolekar et al. |
| 2017/0006495 A1 | 1/2017 | Agarwal et al. |
| 2017/0086121 A1 | 3/2017 | Kaushik |

OTHER PUBLICATIONS

International Application No. PCT/US2016/039073, International Search Report and Written Opinion dated Sep. 16, 2016.
International Application No. PCT/US2016/057397, International Search Report and Written Opinion dated Jan. 13, 2017.

App manager 402

App/app mgr agent 404

| libmgrdpiapi 406 | libmagdpiapi (recv only) 408 | libmdpiapi (send only) 410 |
| libmgrapi | libmapi 412 | libmapi 414 |
| libr2mipc 416 | | |

MOBILE APPLICATION SERVICE ENGINE (MASE)

CROSS-REFERENCE TO RELATED APPLICATIONS

The present invention is a continuation of U.S. patent application Ser. No. 15/789,904, filed Oct. 20, 2017 and entitled "Mobile Application Service Engine (MASE)," now abandoned, which is a continuation-in-part of U.S. patent application Ser. No. 14/938,763, filed Nov. 11, 2015 and entitled "Mobile Application Service Engine (MASE)," U.S. patent application Ser. No. 14/749,580, filed Jun. 24, 2015 and entitled WiFi Airtime Allocation," now abandoned, and U.S. patent application Ser. No. 14/886,636, filed Oct. 19, 2015 and entitled "Distributed Load Balancing for Access Points," now abandoned, all of which are hereby incorporated by reference herein.

TECHNICAL FIELD

The present invention is directed to wireless communications, and more specifically to aspects of WiFi network architecture and services.

NOTICE REGARDING COLOR DRAWINGS

The patent or application file contains at least one drawing executed in color. Copies of this patent application publication with color drawing(s) will be provided by the Office upon request and payment of the necessary fee.

BRIEF DESCRIPTION OF THE DRAWINGS

FIG. 4 illustrates MASE libraries to support MASE applications installed in a given AP device, according to certain embodiments.

DETAILED DESCRIPTION

Figure 1:
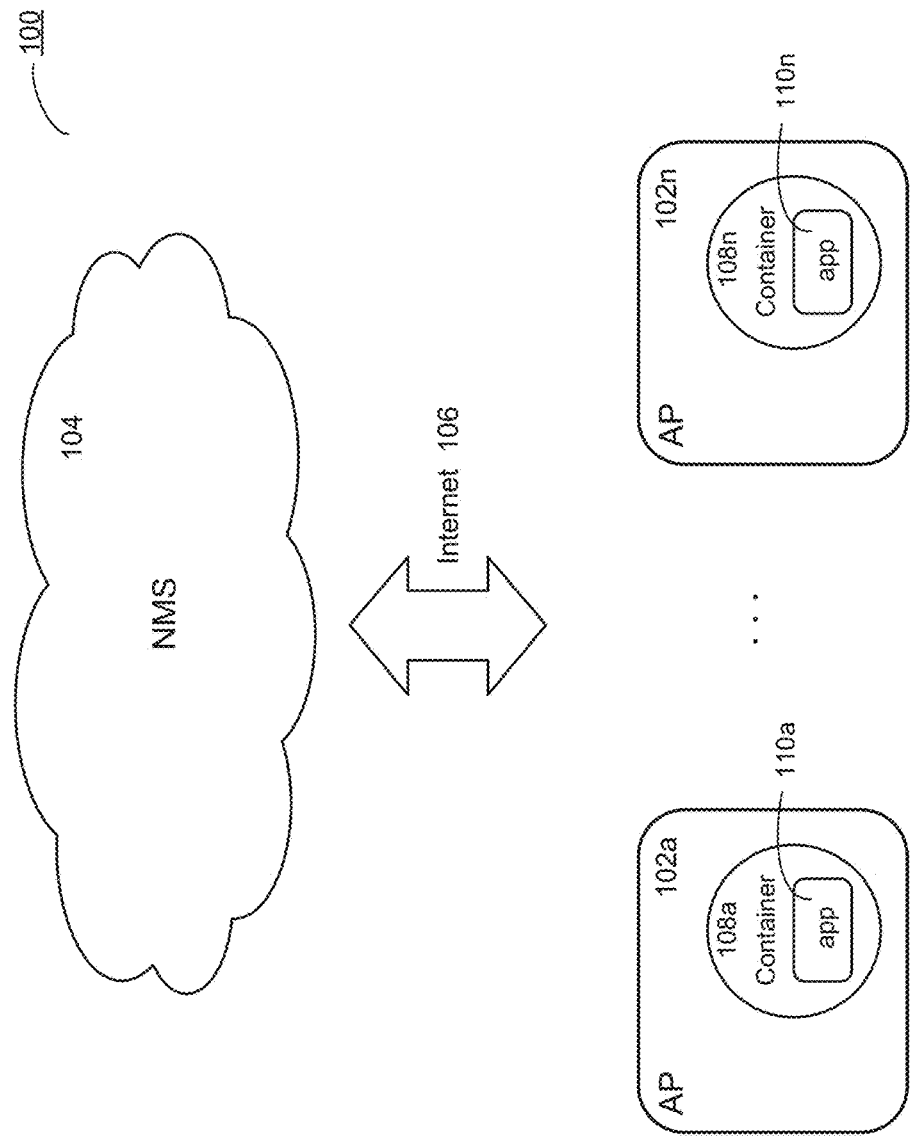
FIG. 1 shows a high-level diagram that illustrates a cloud-controlled service-ready access point device architecture, according to certain embodiments.

Methods, systems, user interfaces, and other aspects of the invention are described. Reference will be made to certain embodiments of the invention, examples of which are illustrated in the accompanying drawings. While the invention will be described in conjunction with the embodiments, it will be understood that it is not intended to limit the invention to these particular embodiments alone. On the contrary, the invention is intended to cover alternatives, modifications and equivalents that are within the spirit and scope of the invention. The specification and drawings are, accordingly, to be regarded in an illustrative rather than a restrictive sense.

Moreover, in the following description, numerous specific details are set forth to provide a thorough understanding of the present invention. However, it will be apparent to one of ordinary skill in the art that the invention may be practiced without these particular details. In other instances, methods, procedures, components, and networks that are well known to those of ordinary skill in the art are not described in detail to avoid obscuring aspects of the present invention.

Mobile Application Service Engine

According to certain embodiments, a mobile application services engine (MASE) enables the deployment (in clusters or otherwise) of third party applications at access point devices ("AP"). According to certain embodiments, such a deployment of third party applications can be managed remotely using a cloud implemented network management system (cloud-based NMS). Further, the NMS can remotely monitor the activities and status of the third party applications deployed in one or more APs associated with the cloud-based NMS. A wireless access point (AP) is a device that allows wireless devices (client devices) to connect to a wired network using Wi-Fi, or related standards. An enterprise grade AP device includes a chipset that is capable of connecting hundreds of wireless client devices to a wired network at the same time.

According to certain embodiments, third party applications are deployed on a given AP using software containers (e.g., Linux containers). Such software containers provide a secure environment for the third party applications, while at the same time, protects the AP by confining a given third party application in an isolated file system as described in greater detail herein. The embodiments are not restricted to Linux containers. The type of containers may vary from implementation to implementation.

According to certain embodiments, such containers preserve the stability and quality of the AP without requiring the customer to override the AP's firmware and/or rebuild the AP's image files. A customer is any establishment or entity that owns or rents APs for deployment in the establishment/buildings. Thus, the customer can be either a retailer or a wireless service provider that deploys the access point device(s).

According to certain embodiments, applications can be grouped (clustered) such that applications of the same group share the same container in a given AP. Thus, application groups that are installed and run in separate containers can reduce interference and conflicts between the application groups.

According to certain embodiments, such third party applications in the containers (herein also referred to as "containerized applications" or "MASE applications") have access to standard Linux services as well as access to advanced features provided by MASE through the MASE application interface (API) on a given AP. For example, standard Linux system services are available to the MASE applications using Linux system calls. Advanced system services are available to the MASE applications through the MASE API.

According to certain embodiments, a MASE application includes configuration files, any libraries and other binaries needed to run the software application, bundled into the container. According to certain embodiments, a given AP device shares the AP's operating system, CPU and memory with the MASE applications.

According to certain embodiments, a given AP device includes a MASE run-time management system to manage and monitor the MASE applications. For example, the MASE run-time management system monitors the use of a given AP's resources by each MASE application to prevent hogging of resources by the MASE applications. According to certain embodiments, in order for an AP device to host MASE applications and to host the MASE run-time management system, the AP device includes: 1) WLAN chipset that is capable of connecting at least about 50 wireless client devices at the same time to the wired network that is associated with the AP device (preferably, the WLAN chipset is capable of connecting at least 100 wireless client devices to the wired network that is associated with the AP device), 2) a stand-alone multi-core CPU (central processing unit) that is capable of hosting relevant WiFi related connection services for wireless client devices, as well as capable of hosting/supporting MASE applications, 3) high-speed and large RAM memory capable of hosting MASE applications on the AP device (e.g., RAM size ranges from approximately 1 gigabyte to approximately 4 gigabyte), 4) high-speed and large permanent storage (e.g., permanent storage size ranges from approximately 8 gigabyte to approximately 128 gigabyte) for supporting MASE applications and for storing large amounts of cached data to support better web-services delivery, and 5) dedicated network processor hardware that is capable of analyzing and controlling IP data packets and for controlling data traffic to achieve reasonable wirespeed in the associated wired network but without adversely impacting CPU cycles of the AP's CPU and without adversely impacting the run-time performance of the MASE applications that are running on the AP device.

According to certain embodiments, third party applications are installed on the one or more APs as MASE application packages using standard ipk packaging (Itsy Package) technology. The embodiments are not limited to ipk packaging technology. The type of packaging technology used may vary from implementation to implementation. An application package includes configuration files, software libraries and executable code, for example.

FIG. 1 shows a high-level diagram that illustrates a cloud-controlled service-ready access point device architecture 100, according to certain embodiments. FIG. 1 shows a plurality of cloud-controlled service-ready access point devices (AP) 102a, . . . , AP 102n and a cloud-based NMS 104.

AP 102a . . . AP 102n are associated with the cloud-based NMS 104 in a cloud infrastructure that supports the plurality of cloud-controlled service-ready access point devices. Each of AP 102a, . . . , AP 102n includes a respective container 108a, . . . , 108n, which in turn includes a respective application 110a, . . . , 110n. The applications 110a, . . . , 110n are MASE applications because they are containerized at the respective APs.

According to certain embodiments, each AP device can include one container or multiple containers. Further, each container can contain one MASE application or multiple MASE applications. For example, applications can be grouped so that the applications of the same group can share the same container in a given AP. Application groups that are installed and run in separate containers can reduce interference and conflicts between the application groups.

According to certain embodiments, the cloud-based NMS 104 has the following functions with respect to the MASE applications: 1) deploy the MASE applications in the one or more APs, 2) manage installation of the one or more MASE applications, 3) upgrade the one or more MASE applications when needed, 4) monitor the running status of the one or more MASE applications, 5) configure the one or more MASE applications, and 6) maintain the one or more MASE applications (e.g., the access to syslog files of MASE applications are implemented through the cloud-based NMS).

According to certain embodiments, the APs use open source Linux (OpenWRT). According to certain embodiments, third party developers use the MASE API and the MASE software development kit (SDK, which is based on the OpenWRT build environment) to develop the MASE application. The MASE SDK includes tools for third party developers to build MASE application packages and to download the application packages to the APs. The embodiments are not limited to the Linux OpenWRT operating system. The type of operating system used for the AP may vary from implementation to implementation. The MASE applications can be uploaded to the cloud-based NMS. According to certain embodiments, the Cloud based NMS provides an interactive GUI (graphical user interface) to facilitate the upload process.

According to certain embodiments, cloud-based NMS 104 is the network management system that manages clusters of APs. Cloud-based NMS 104 is responsible for the full cycle deployment of third party applications such that the applications can be managed remotely via cloud-based NMS 104 without any need of performing administrative tasks locally on the APs.

Figure 5:
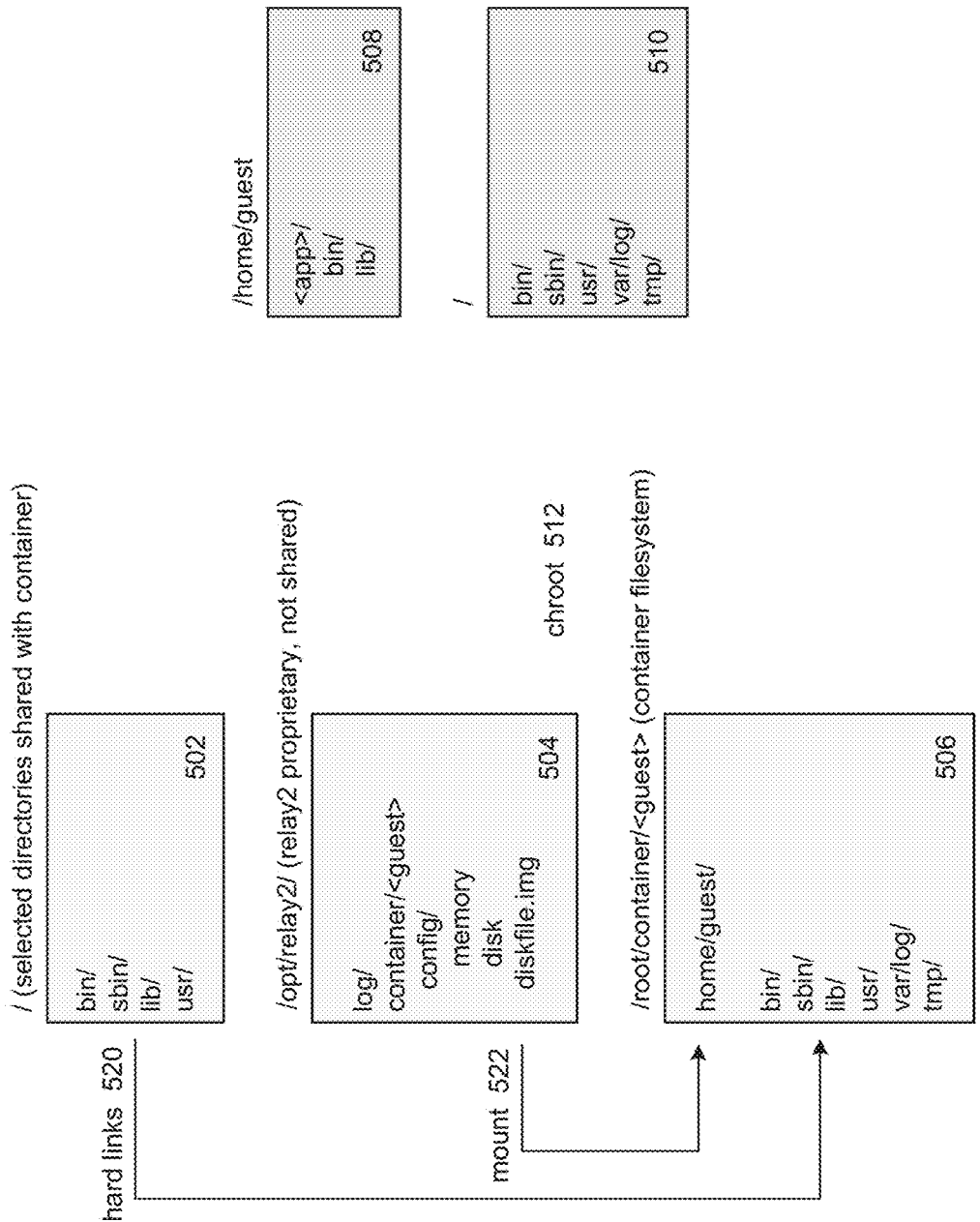
FIG. 5 illustrates segregation of a portion of the AP file system to confine MASE applications, according to certain embodiments.

According to certain embodiments, MASE applications can be effectively "walled-off" by confining them to a pre-allocated a sub-file system of limited size within the AP file system as explained in greater detail herein with reference to FIG. 5, herein.

Figure 2:
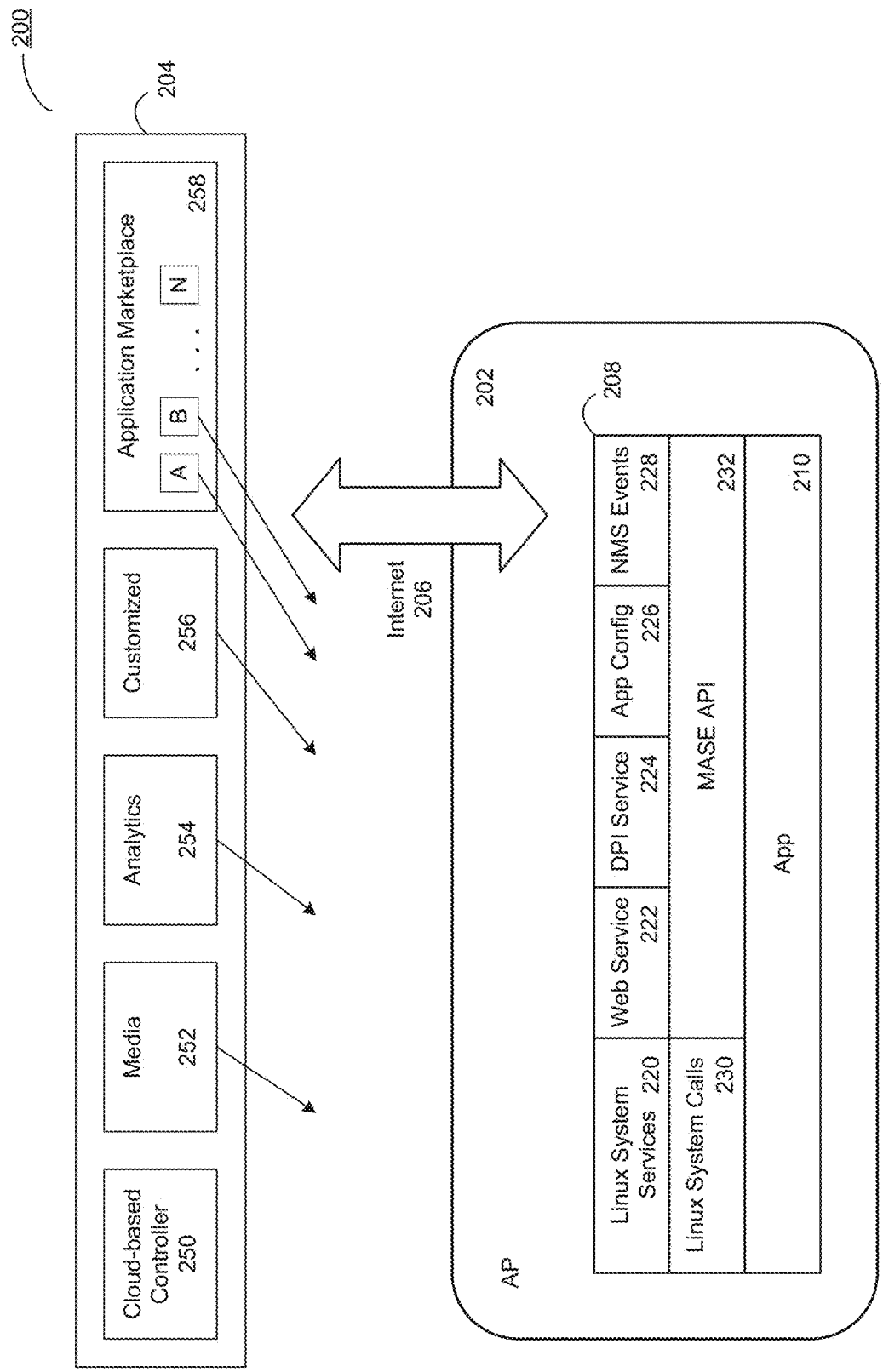
FIG. 2 illustrates the cloud-controlled service-ready access point device architecture of FIG. 1 in greater detail, according to certain embodiments.

FIG. 2 illustrates the cloud-controlled service-ready access point device architecture 200 in greater detail, according to certain embodiments. For purposes of convenience, FIG. 2 shows only one of the APs of the plurality of APs.

In FIG. 2, cloud-based NMS 204 includes a cloud-based controller 250 and MASE applications that can be downloaded and installed on AP device 202. As non-limiting examples, the MASE applications stored in NMS 204 include media applications 252, analytics applications 254, customized applications 256, as well as various applications A-N in application marketplace 258 from which a customer can choose to download one or more applications A-N onto the AP device 202.

For purposes of explanation, assume that a customer that owns or leases AP device 202 would like to have several MASE applications downloaded to AP device 202.

According to certain embodiments, AP device (AP) 202 communicates with cloud-based NMS 204 through a secure tunnel in Internet 206, for example.

According to certain embodiments, non-limiting examples of characteristics of AP device 202 that include operating system services 220 (e.g., Linux system services), web service 222, deep packet inspection (DPI) service 224, application configuration 226, NMS events interface 228, operating system calls 230, MASE application programing interface 232 (MASE API), MASE application 210 (downloaded from cloud-based NMS 204). According to certain embodiments, an application configuration that is specific to an application for a specific AP or cluster of APs can be specified at the NMS and then downloaded to the specific AP or cluster of APs. The MASE API on the AP delivers the configuration to the relevant application using callbacks that the given MASE application registers with the MASE API, for example.

According to certain embodiments, AP device 202 also includes physical resources on the AP device such as a network processor, a WLAN chipset capable of connecting more than 50 wireless clients to a wired network at the same time, an AP RAM memory, permanent storage, AP multi-core central processing units (CPU), and an AP file system. Such physical resources are on the AP device.

Application marketplace 258 is a repository of third party applications that are developed using the MASE technology, according to certain embodiments.

Third party application developers use the MASE software development kit (SDK) to develop MASE applications that can be deployed in a given AP device. When the third party application developers upload their MASE applications to application marketplace 258, the third party application developers can define the type of MASE APs where the applications can be deployed. The third party application developers can define their applications as private or public applications. Private applications can only be deployed at APs that are managed by the same AP providers that the third party developers are associated with. Public applications can be deployed at any of the APs, and a licensing scheme is available for the third party developer to collect licensing fees from AP owners that deploy the public applications, according to certain embodiments.

Further, third party application developers can define the type of configuration that can be applied to the applications, such as the name of the configuration parameters, the type of the parameters and the range or possible values of the parameters. A configuration can be defined for a group of APs where the application is deployed, or a configuration can be defined for a specific AP.

According to certain embodiments, the MASE SDK includes the open source OpenWRT build environment, with which the third party developer can use to build the application and package the application in the standard ipk package. The SDK also includes the MASE API library and the header file, which can be included in the application if the third party developer decides to leverage the system services provided by the MASE API.

Further, the SDK includes a suite of tools that allow the third party developer to manage the installation of the applications of the third party developer on a MASE AP device as part of the development test bed. The MASE API is required to run in a developer mode, according to certain embodiments. When the developer mode is enabled, the AP handles the installation commands generated by the tool suite.

According to certain embodiments, AP owners can select MASE applications to be deployed on their APs. For example, AP owners can select either private applications that are developed by their own developers, or public applications that are developed by any third party developers. When the applications are selected to be deployed or installed on some APs, configurations can be specified for the group of APs based on the requirements of the particular deployments. Further, the AP owners can decide whether the applications, after they are installed on the APs, should start or stop running, or whether they should be restarted. The AP owners can do so by specifying the running status of the applications.

According to certain embodiments, the cloud-based NMS 204 implements different interfaces and tools for application maintenance. For example, the status and health of the MASE applications (as well as memory usage, CPU usage and disk usage) can be monitored at cloud-based NMS 204. The application status and health are updated consistently.

As another example, if MASE application 210 has crashed and is restarted, events are generated and can be reviewed at the NMS event log at cloud-based NMS 204. Application syslog message files are uploaded to the cloud-based NMS 204 and can be retrieved for review, for example.

According to certain embodiments, MASE applications 210 running in containers on the AP have access to standard Linux system services 220 such as the file system and internetworking features (for example, TCPIP protocol, UDP protocol, HTTP server connections, and various software libraries). In addition, advanced features such as Web services are available to the MASE applications via MASE API. Further, the MASE API 232 supports cloud-based application configuration and event logging. The embodiments are not limited to Linux operating systems. The type of operating systems may vary from implementation to implementation.

Third party MASE applications 210 deployed at APs have access to all standard Linux system services 220. Linux system services 220 include but are not limited to: 1) Pre-allocated disk space for a variety purposes such as application data storage, 2) IP internetworking through UNIX socket API, and 3) Standard UNIX syslog service.

According to certain embodiments, MASE applications 210 are installed and run within the confinement of container 208. Container 208 is constructed based on Linux technologies, according to certain embodiments. For example, container 208 uses the same standard Linux tools and libraries built in the AP image from the OpenWRT distribution. Each MASE application 210 has pre-allocated disk space in an isolated file system inside the container. Each MASE application 210 has full read and write access to its dedicated pre-allocated disk space. However, the MASE application 210 has only read access outside its dedicated pre-allocated disk space within the container when running as a non-privileged user. The construction of container 208 may be based on other technologies and is not limited to Linux technologies and may vary from implementation to implementation.

According to certain embodiments, MASE applications 210 are packaged using the standard ipk package format that is used by the open source OpenWRT build environment. Application installation at a given AP is managed through the cloud-based NMS 204 remotely. Standard application installation scripts (e.g., preinst, postinst, prerm, postrm) are supported and invoked as applications are installed or uninstalled at a given AP, according to certain embodiments.

According to certain embodiments, the running status of a MASE application 210 is managed remotely at cloud-based NMS 204. The MASE application 210 is started or stopped using a service status management mechanism via application "init" script that is installed at location/etc/init.d/, for example. Init script commands, e.g., start, stop, restart, status, are used to manage the application status.

According to certain embodiments, while MASE applications 210 are running within the confinement of a container 208 on the AP, the MASE applications 210 have full access to other system resources on the AP such as the physical memory and CPU cycles of the AP. According to certain embodiments, a given MASE application 210 can specify the amount of system resources that the given MASE application needs in the application package manifest. According to certain embodiments, the amount of system resources are capped at a hard limit when the MASE application 210 is installed on the one or more APs. MASE applications 210 are more or less continuously monitored and can be restarted as soon as they are found to have used up too many AP resources based on the predefined limits, according to certain embodiments.

According to certain embodiments, application configuration is managed at cloud-based NMS 204. However, the configuration information 226 is eventually passed to the MASE application 210 via the MASE API 232. If the MASE application 210 requires configuration support from cloud-based NMS 204, the MASE application 210 can use the MASE API 232 in order to receive the application configuration information.

Web applications are server side applications that implement specific Web requests from wireless clients. According to certain embodiments, there are three models of web applications for accessing the web requests. According to certain embodiments, the three models of web applications for accessing the web requests are: 1) Proxy service model based on domain names specified by applications, 2) Static web content model, 3) FCGI applications model. MASE API 232 provides advanced HTTP proxy service based on proxy requirements specified by the MASE application 210. When HTTP proxy service is enabled for certain domain names, the HTTP requests are proxied and forwarded to proxy HTTP/TCP ports that the MASE application 210 specifies. The MASE application 210 can implement an HTTP server on such proxy HTTP/TCP ports to service the proxied HTTP requests received at those HTTP/TCP ports.

According to certain embodiments, Web service 222 can host static Web content packaged in the application ipk package. Third party developers can package Web content, such as HTML pages, JavaScript programs, and multimedia files (pictures/audio/video) in the MASE application package together with a Web hosting manifest that specifies the base URL locations (including host names and base paths) for the Web content. When the MASE application 210 is installed, Web service 222 is reconfigured to support the URL locations specified in the Web hosting manifest.

According to certain embodiments, third party applications can implement the standard fast common gateway interface (FCGI). The FCGI applications are installed in the same Linux container environment as regular third party MASE applications on the APs, but are invoked as FCGI applications with Web service 222 handling the Web request before invoking the third party applications via the standard FCGI protocol. Web service 222 can be configured to invoke the third party applications for selected URLs based on FCGI Web hosting manifest, which is packaged together with the third party FCGI application in the application ipk package. For example, when a client device requests a web page or a video from the internet, web service 222 will check to see if there is a match in the URL list. If there is a match, web service 222 invokes the FCGI application, which in turn, will analyze the request from the client device and decide on the appropriate response to send to the client device.

According to certain embodiments, DPI service 224 supports DPI related applications by providing advanced flow-based packet sniffing. Packets can be captured on a per flow basis, with adjustments allowed to sniff more or fewer packets for a particular flow. In addition, DPI analytic applications can use the MASE API 232 to export statistics and reports to the cloud-based NMS 204. Cloud-based NMS 204 can provide cloud-based storage and GUI integration for display purposes.

According to certain embodiments, MASE API 232 allows the third party application to access various system services. For example, application configuration is managed at cloud-based NMS 204, which sends the configuration information to the relevant AP where the application is deployed. The configuration information is sent to the application via MASE API 232. As another example, for all the HTTP requests that the MASE application 210 would like Web service 222 to proxy on behalf of the MASE application 210, the MASE application 210 can specify the domain names of such URLs via the MASE API 232 together with the proxy HTTP/TCP port number. The MASE API 232 reconfigures the networking stack on the AP to proxy the HTTP requests destined for such domain names, and forwards the requests to the specified proxy HTTP/TCP ports. The third party application can implement a Web server on such proxy HTTP/TCP ports to receive the proxied HTTP requests. Further, flow-based packet sniffing is supported to capture packets for DPI analysis. Statistics and reports are exported to cloud-based NMS 204 for integration with cloud-based services provided by cloud-based NMS 204. In addition, cloud-based NMS 204 implements an event log to log various kinds of system events related to activities at the APs. MASE applications 210 can generate events using MASE API 232 so that such events can be logged at the event log in cloud-based NMS 204.

Figure 3A:
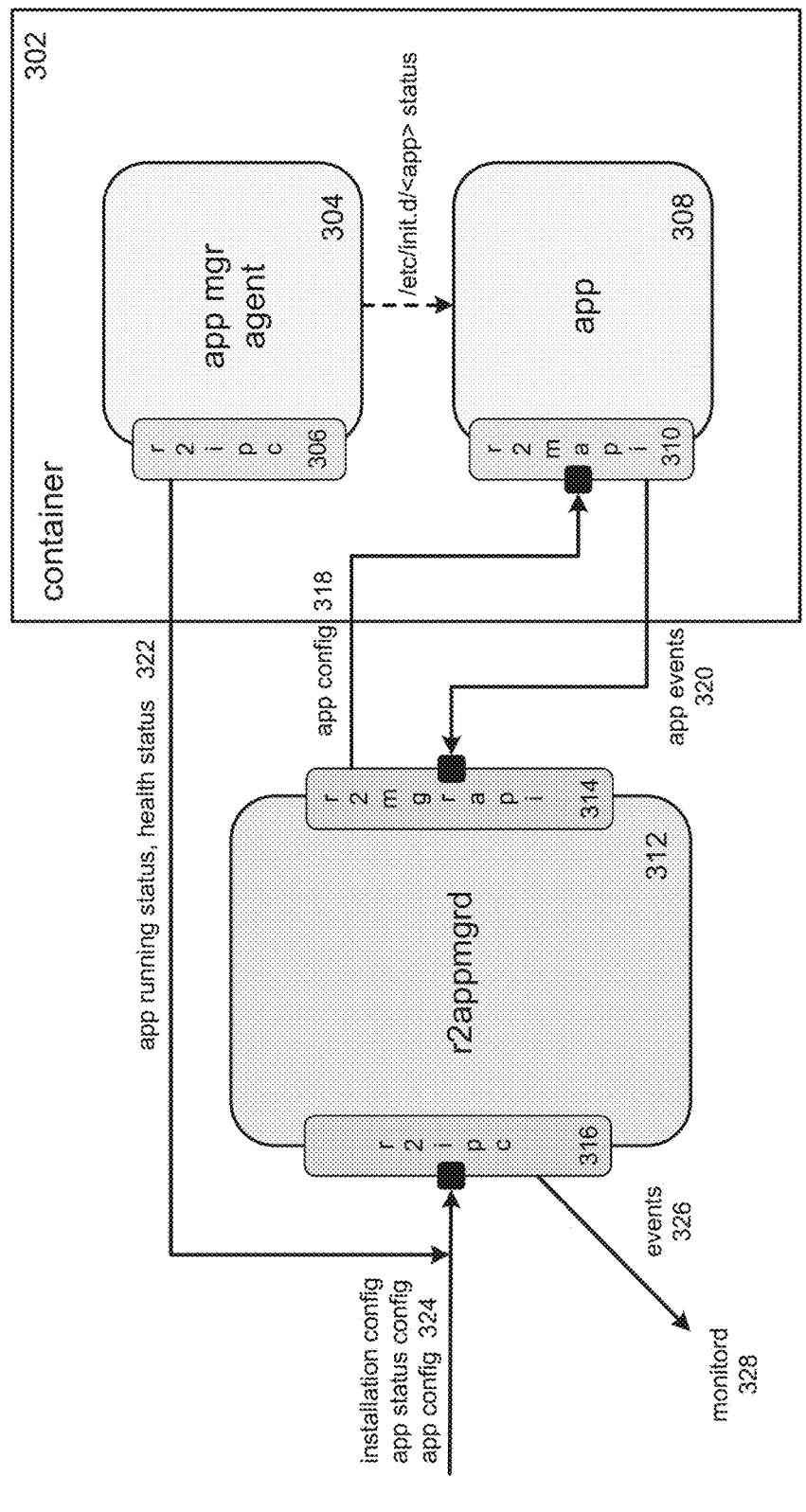
FIGS. 3A, 3B and 3C illustrate management of MASE applications, according to certain embodiments.
Figure 3B:
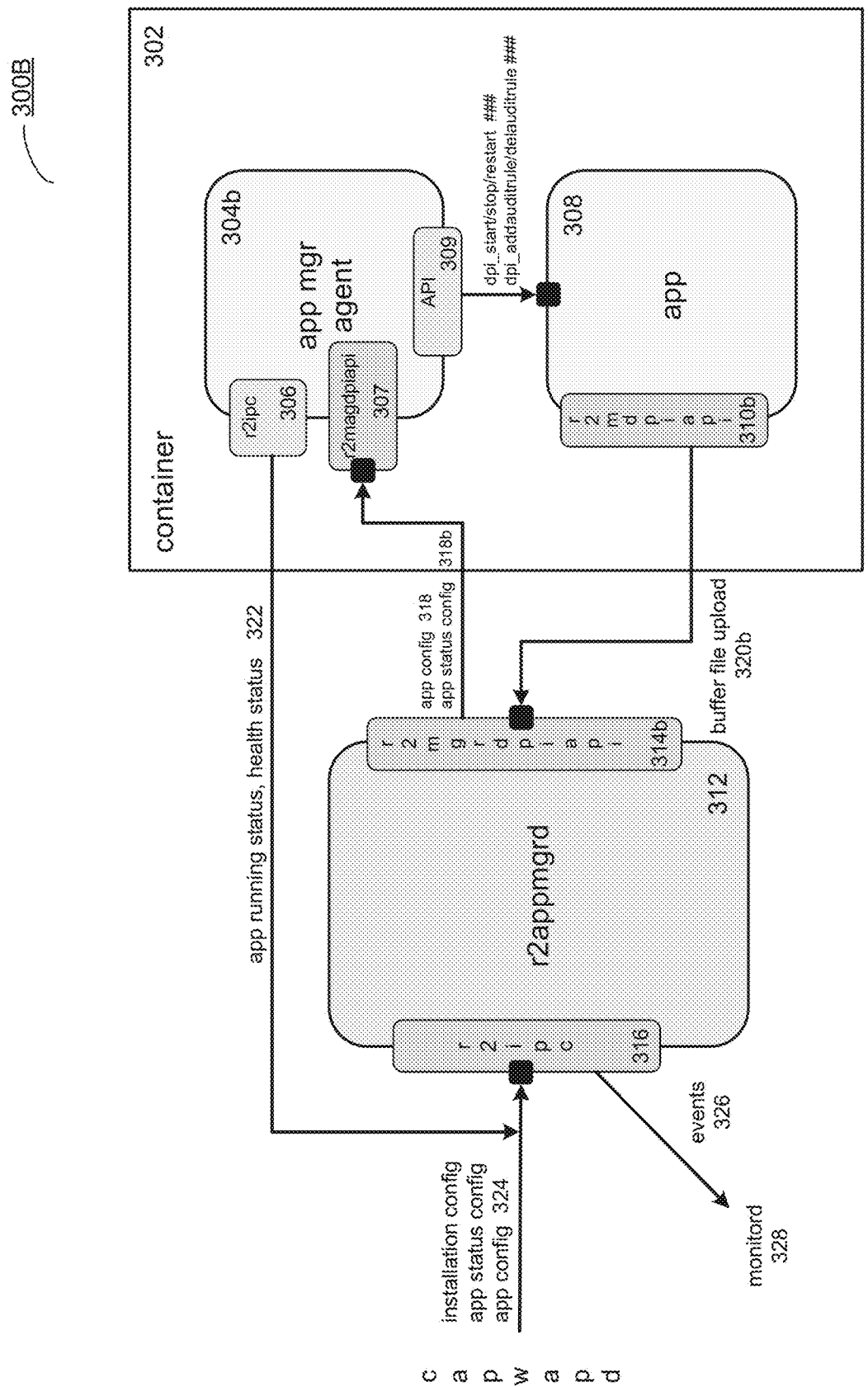
Figure 3C:
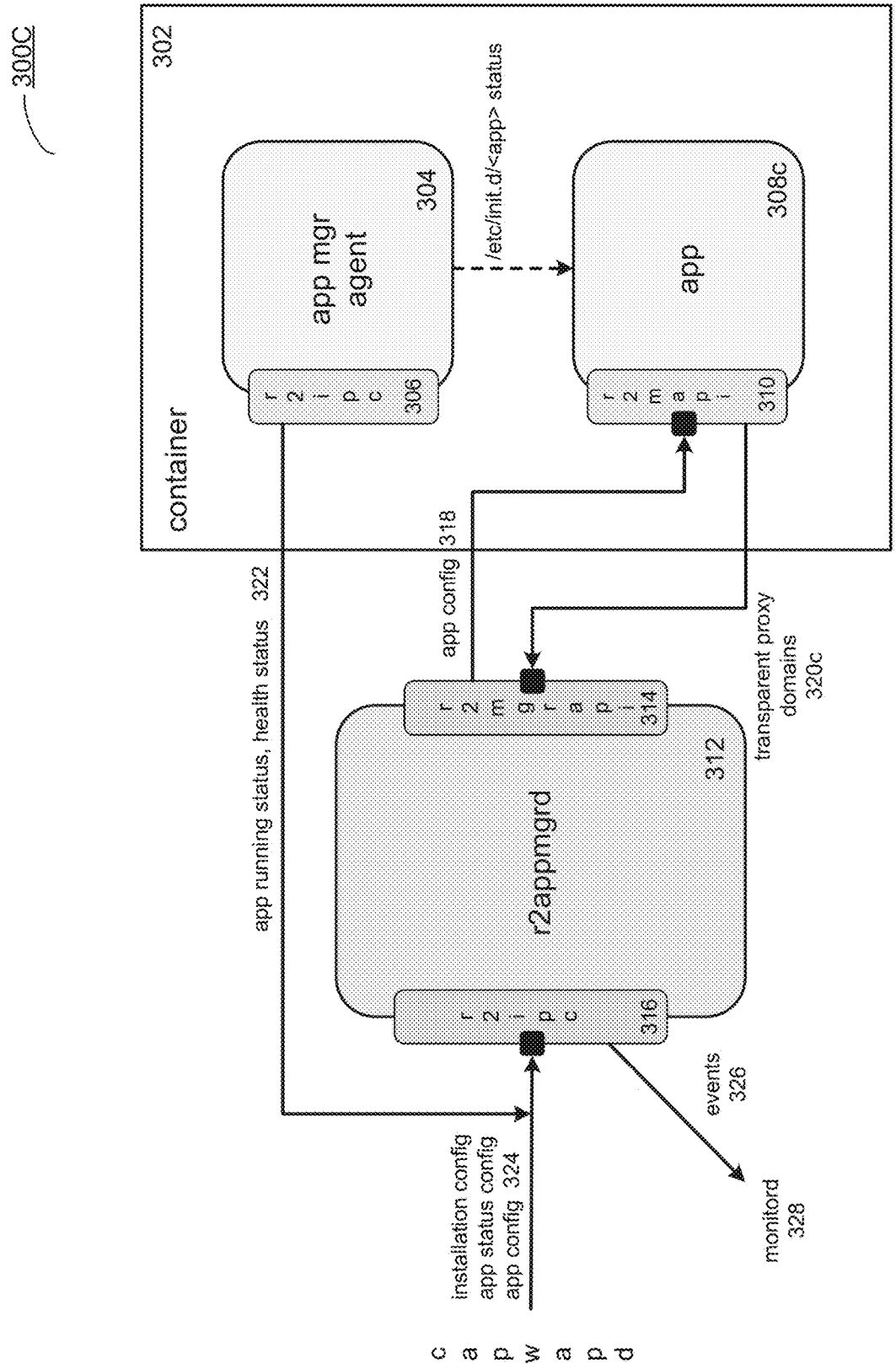

FIGS. 3A, 3B and 3C illustrate management of MASE applications, according to certain embodiments. FIG. 3A shows MASE application environment 300A on an AP. FIG. 3A shows container 302 that includes an application manager agent 304, and MASE application 308. Application manager agent 304 communicates with the AP's application manager daemon 312 via inter-process communication (IPC) 316. For example, application manager agent 304 monitors CPU usage, memory usage (e.g., RAM usage), and disk usage of the MASE application 308. Application manager daemon 312 handles problems locally at the AP based on pre-determined policies, for example. Application manager agent 304 communicates information 322 (such as application running status, health status) to application manager daemon 312. Application manager agent 304 also communicates relevant information with MASE application 308. MASE application 308 uses MASE API 310 to communicate information 320 (e.g., application events) to application manager daemon 312 via MASE manager API 314. MASE application 308 receives application configuration information 318 from application manager daemon 312 via MASE manager API 314 and MASE API 310. Further, application manager daemon 312 communicates event information 326 to the monitor daemon 328 on the AP. Also, application manager daemon 312 can receive information 324 (e.g., installation configuration information, application status configuration information, application configuration information) from the cloud-based NMS, according to certain embodiments.

FIG. 3B shows a different embodiment of application manager agent 304b. Application manager agent 304b includes a MASE DPI API 307 that can receive information such as application configuration and application status configuration (318, 318b) from MASE manager DPI API 314b. Further, application manager agent 304b uses API 309 to communicate (e.g., DPI information) with MASE application 308. MASE application 308 uses MASE DPI API 310b to send buffer file upload 320b to application manager daemon 312 through MASE manager DPI API 314b.

FIG. 3C shows a different embodiment of MASE application 308c, which uses MASE API 310 to communicate transparent proxy domain information 320c to application manager daemon 312 via MASE manager API 314.

FIG. 4 illustrates MASE libraries to support MASE applications installed in a given AP device, according to certain embodiments. FIG. 4 shows application manager library layers 402 and Application/application manager agent library layers 404 in a MASE library architecture 400, according to certain embodiments. Application manager library layers 402 are not exposed to third party developers and comprise a private dpi library layer 406, and a private API library layer 412. Application/application manager agent library layers 404 comprise a receive-only DPI library layer 408 a send-only DPI library layer 410, and an API library layer 414, according to certain embodiments. FIG. 4 also shows a communication transport layer 416 for IPC messages, according to certain embodiments.

FIG. 5 illustrates segregation of a portion of the AP file system to confine MASE applications, according to certain embodiments. FIG. 5 shows the file system 500 of a given AP. According to certain embodiments, file system 500 comprises: 1) selected directories 502 that can be shared with the MASE application container, via hard links 520, 2) proprietary directories 504 that are not shared with the MASE application container, and 3) the container file system 506. Container file system 506 uses change root (chroot) for all guest processes (directories 508, and 510). According to certain embodiments, even though the proprietary directories 504 are not shared with the MASE application container, the proprietary directories 504 include a virtual disk partition in the form of a disk image that contains the writeable disk space to which a given MASE application container can write data. Mount 522 is a Linux process for making the virtual disk partition accessible by the MASE applications through regular Linux filesystem management commands (e.g., commands related to creating files, writing to a file, creating subdirectories, etc.). In other words, the MASE applications on the AP device has access to such a virtual disk partition. The embodiments are not limited to Linux-type file systems. The file systems may vary from implementation to implementation.

According to certain embodiments, a method of WiFi networking comprises: deploying containerized applications (MASE applications) on a wireless access point device of a plurality of wireless access point devices that are associated with a WiFi network for connecting a plurality of wireless client devices to a wired network. The method comprises using at least one application container on the AP device. The method further comprises installing one or more third party applications in the at least one application container on the AP device. The method further comprising using an AP device that includes: 1) a WLAN chipset on the AP device, which WLAN chipset is capable of connecting at least about 50 wireless client devices at the same time to the wired network that is associated with the AP device (preferably, the WLAN chipset is capable of connecting at least 100 wireless client devices to the wired network that is associated with the AP device), 2) a stand-alone multi-core CPU (central processing unit) on the AP device, which stand-alone multi-core CPU is capable of hosting relevant WiFi related connection services for wireless client devices, as well as capable of hosting/supporting MASE applications, 3) a high-speed and large RAM memory on the AP device, which RAM memory is capable of hosting MASE applications on the AP device, 4) high-speed and large permanent storage on the AP device for supporting MASE applications and for storing large amounts of cached data to support better web-services delivery, 5) dedicated network processor on the AP device, which dedicated network processor is capable of analyzing and controlling IP data packets and for controlling data traffic to achieve reasonable wirespeed in the associated wired network but without adversely impacting CPU cycles of the AP's CPU and without adversely impacting the run-time performance of the MASE applications that are running on the AP device. The method further comprises using a pre-allocated segregated disk space within a file system on the AP device that can be accessed and used by the containerized applications that are installed on the AP device. The method further comprises using an application run-time management system on the AP device to monitor the execution of the containerized third party applications and including monitoring the CPU usage, RAM usage, disk storage usage, application running status, application health status, and application events. The method further comprises using a MASE application programming interface (MASE API) on the AP device to provide web services to the MASE applications installed on the AP device and to provide deep packet inspection services to the MASE applications installed on the AP device.

WiFi Airtime Allocation

According to certain embodiments, the consumption of airtime allocated to each connected wireless client device (also referred to herein as a connected wireless node) of at least a subset of wireless client devices/nodes that are connected to corresponding access point devices in a wireless system is distributed across a cycle time. According to certain embodiments, a cycle time is a predetermined value and is the duration of time per iteration.

According to certain embodiments, the consumption of airtime that is allocated to each wireless client device/node is distributed across a cycle period based on calculating the airtime required for the given wireless client device/node of a plurality of wireless client devices/nodes for transmitting a packet when connected to a corresponding access point device in the wireless communication system.

According to certain embodiments, the airtime allocated to each connected wireless client device/node is estimated based on comparing the required airtime for the respective connected wireless client device/node with the available airtime for each connected wireless client device/node, where available time is the total available airtime in the cycle divided by the total number of connected wireless nodes.

According to certain embodiments, the consumption of airtime that is allocated to each wireless client device is distributed across a cycle period based on comparing the consumed airtime of the given wireless client device/node with the elapsed cycle time when the given wireless client is connected to a corresponding access point device in the wireless communication system.

According to certain embodiments, the distribution of consumption of airtime allocated to each connected wireless client device/node across a cycle period in the wireless communication system of a plurality of wireless client devices/nodes includes throttling transmission of packets of the given connected wireless client device/node based on one or more pre-determined criteria.

According to certain embodiments, the distribution of consumption of airtime allocated to each connected wireless client device/node across a cycle period in the wireless communication system of a plurality of wireless client devices/nodes includes providing feedback information including computation of airtime transmission of a given packet by the given connected wireless client device/node through its associated access point device.

A given connected wireless client device/node in a wireless communication system can consume its corresponding allocated airtime per cycle all at once in the cycle. Such a connected wireless client device/node can result in hogging the transmission channel at its associated access point device. Thus, according to certain embodiments, a given connected wireless client device/node in a wireless communication system is controlled to consume its allocated airtime in a controlled distributed manner across a cycle to prevent excessive hogging of a transmission channel and/or to prevent excessive dropping of packets.

According to certain embodiments, such a wireless communication system periodically estimates the airtime required by a given connected wireless node and throttles the given node's transmission of packets across a given cycle based on the usage of airtime per cycle. Further, such a wireless communication system provides correction feedback information per cycle to the airtime estimation engine.

Figure 6:
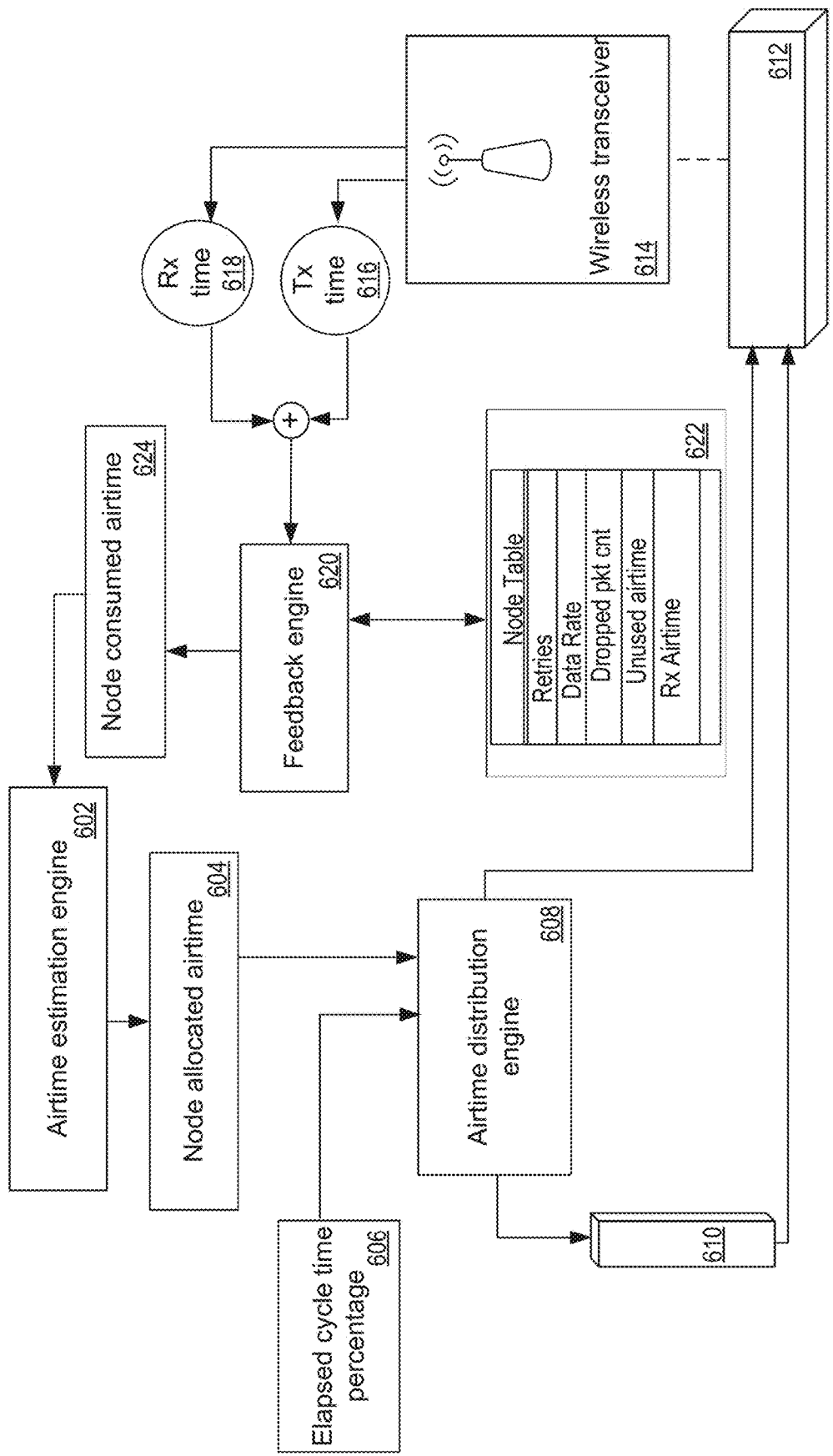
FIG. 6 is a high-level network diagram showing aspects of distributing the consumption of airtime allocated to each connected wireless client device across a cycle time in a wireless communication network, according to certain embodiments.

FIG. 6 is a high-level network diagram showing aspects of distributing the consumption of airtime allocated to each connected wireless client device across a cycle time in a wireless communication network, according to certain embodiments. In FIG. 6, at block 602, the airtime estimation engine calculates the node allocated airtime for a given connected wireless node of at least a subset of a plurality of wireless nodes connected to a corresponding access point in the wireless communication network to produce the corresponding node allocated airtime result at block 604. Node allocated airtime is the duration of time allocated to a connected wireless node for receiving and transmitting packets per cycle time, according to certain embodiments. At block 608, an airtime distribution engine receives an elapsed cycle time percentage value as an input from block 606 and also receives the node allocated airtime result from block 604 and uses such inputs for determining whether to send a packet that the given connected wireless node is attempting to send (or receive) to a throttler at block 610 or to send the packet to the wireless transceiver at block 612. FIG. 6 also shows some functional aspect of the wireless transceiver at the physical layer shown at block 614. At the physical layer, the wireless transceiver adds the time that the given connected wireless node used to transmit (616) a given packet with the time the given connected wireless node used to receive (618) a packet and send the information to a feedback engine 620. The feedback engine 620 updates a feedback table 622. For example, the feedback table includes information such as number of transmission retries, data rate, unused airtime, drop airtime, transmission airtime, receiving airtime, Request-to-Send (RTS) flags, Clear-to-Send (CTS) flags etc, according to certain embodiments. At block 624, the feedback engine send information on the airtime consumed by the given connected wireless node to the airtime estimation engine. The process described with reference to FIG. 6 is repeated for each connected wireless node of at least a subset of a plurality of wireless nodes connected to the corresponding access point in the wireless communication network, according to certain embodiments.

FIGS. 7A, 7B, 7C, and 7D are high-level flow charts showing aspects of an airtime calculation engine for wireless nodes client devices connected to wireless access point devices in a wireless network, according to certain embodiments. The processes in FIGS. 7A, 7B, 7C, and 7D are described with respect to a given connected wireless node and are repeated for each connected wireless node of at least a subset of the plurality of wireless nodes connected to the corresponding access point in the wireless communication network, according to certain embodiments.

Figure 7A:
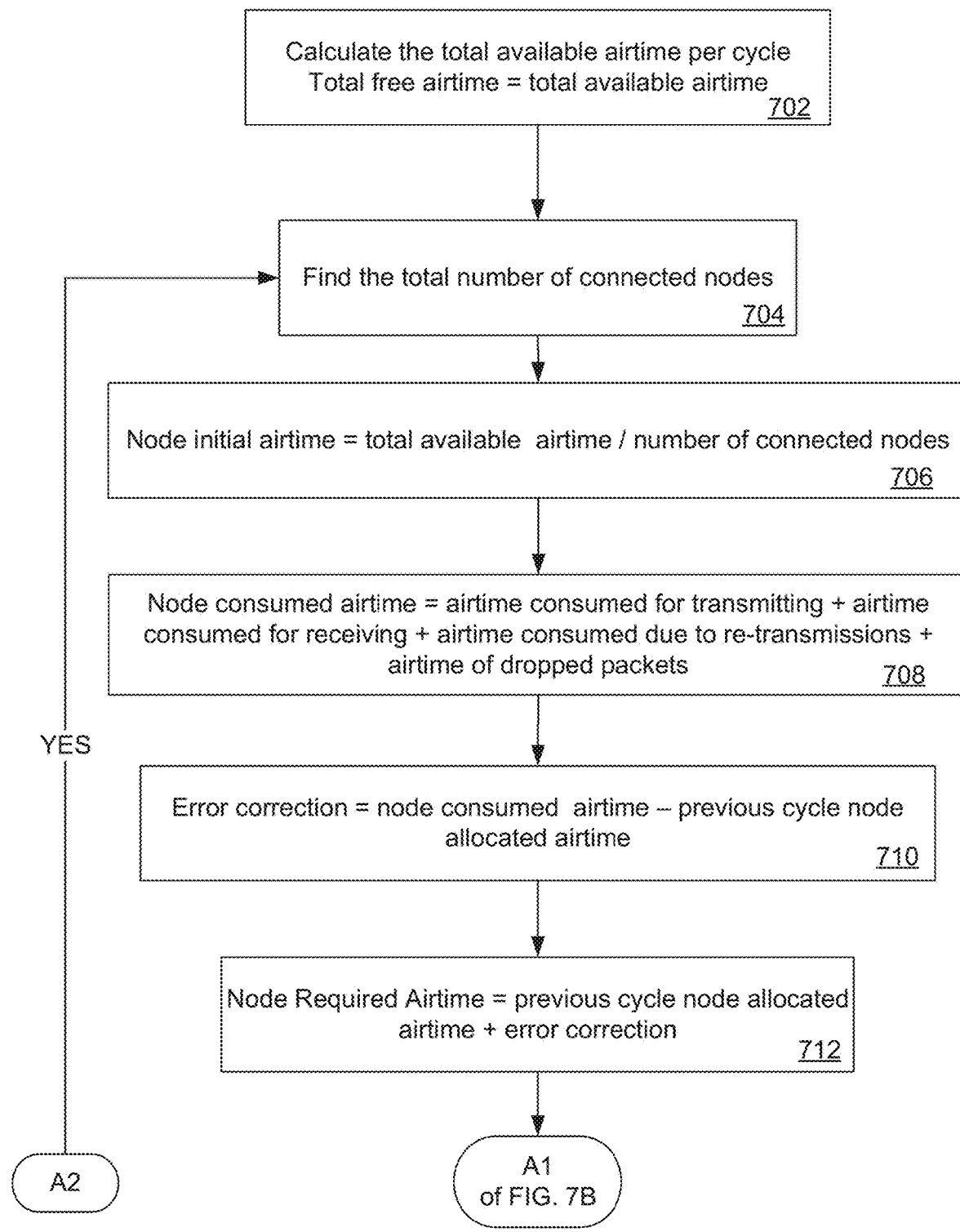
FIGS. 7A, 7B, 7C, and 7D are high-level flow charts showing aspects of an airtime calculation engine for wireless nodes client devices connected to wireless access point devices in a wireless network, according to certain embodiments.

At block 702 in FIG. 7A, the airtime estimation engine calculates the total available airtime per cycle for a given connected wireless node. According to certain embodiments, the total available airtime=(100−channel congestion) X cycle time, according to certain embodiments. For example, the channel congestion is the amount of channel capacity that is currently in use and therefore not available for transceiving packets for the given connected wireless node. Further, at block 702, total free airtime=total available airtime. At block 704, the airtime estimation engine determines the total number of wireless nodes connected to the given access point (referred herein as "connected wireless nodes") in the wireless communication network. At block 706, the airtime estimation engine calculates the airtime than can be shared by the connected wireless nodes. Such an estimate is referred to as a node initial airtime. Node initial airtime=total available airtime/number of connected wireless nodes, according to certain embodiments. At block 708, for the given connected wireless node, the airtime estimation engine calculates the airtime used by the given connected wireless node (also referred to as "node used airtime" or "node consumed airtime") in the previous cycle. The node consumed airtime is provided by the feedback engine as explained in greater detail herein. The node used airtime will be zero for wireless nodes that are newly connected to the access point in the current cycle. According to certain embodiments, at block 708, the airtime estimation engine makes the following calculation: node used airtime=airtime consumed by the given connected node for transmitting packets+airtime consumed by the given connected node for receiving packets+airtime consumed by the given connected node due to re-transmissions+estimated airtime consumed by the given connected node for packets dropped.

Re-transmissions are also known as retries. A WiFi medium is not a deterministic medium because of channel interference. There may be many retries in the channel due to interference. Retries are the number of times a connected wireless node tries to transmit a data packet until the packet is successfully transmitted. For example, a successful transmission is when the connected wireless node receives an acknowledgment for each of the data packets it has transmitted. A given connected wireless node will retry sending packets that are not acknowledged by the receiver. Retries are more frequent when the WiFi channel is congested, or if the given connected wireless node is far away from the access point and/or is not in the line of sight of the access point. In some wireless chipsets of wireless nodes, the number of retries may be pre-programmed for every packet so that the packets are resent automatically.

A connected wireless node that attempts many retries will occupy much more airtime than a connected wireless node that is able to send data packets successfully with few or no retires. RTS/CTS (Request to Send/Clear to Send) comprise an optional mechanism used by the 802.11 wireless networking protocol to reduce frame collisions introduced by wireless node problems. As the number of retries grows, the rate controller of the WiFi system will assume that the link quality is bad and will try to protect each frame with RTS/CTS messages. The amount of airtime consumed by RTS/CTS messages needs to be accounted for with respect to the given connected wireless node that is attempting to send the data packet. For purposes of illustration, assume that connected Wireless Node1 and Wireless Node2 are attempting to send packets. Further assume that Wireless Node1 is sending packets with RTS/CTS exchange mechanism. The airtime consumed by Wireless Node1 will be higher than that of Wireless Node2.

At block 710 of FIG. 7A, the airtime estimation engine calculates the error correction based on the inputs for the previous cycle. The error correction is needed to calculate the airtime required by the given connected wireless node for transmitting/receiving packets. According to certain embodiments, error correction=node used airtime—previous cycle node allocated airtime.

At block 712 of FIG. 7A, the airtime estimation engine calculates the airtime required by the given node in the current cycle to transmit/receive packets. According to certain embodiments, the node required airtime=previous cycle node allocated airtime+error correction. Control of the process passes to block A1 of FIG. 7B.

Figure 7B:
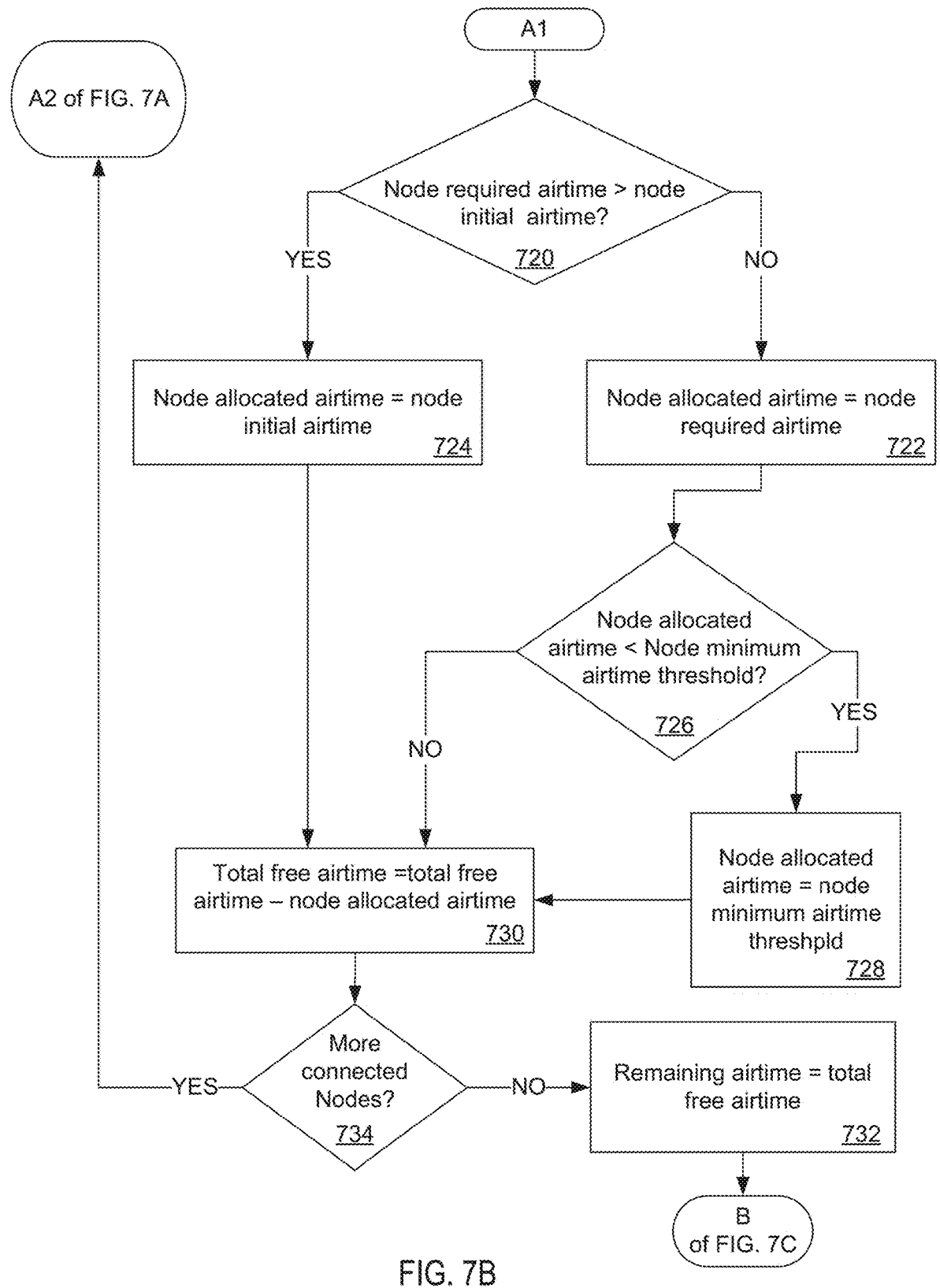

At block 720 of FIG. 7B, the airtime estimation engine determines, for the given connected wireless node, if the node required airtime is greater than the node initial airtime. If the node required airtime is greater than the node initial airtime, then at block 724, the given node is allocated the node initial airtime. At block 730, the total free airtime is calculated again as: total free airtime=total free airtime—node allocated airtime. At block 734, the airtime estimation engine determines if there are more connected wireless nodes for which airtime needs to be estimated. If there are more connected wireless nodes for which airtime needs to be estimated, then control passes to block A2 of FIG. 7A. From block A2 of FIG. 7A, control passes back block 704 that is previously described herein with reference to FIG. 7A. If there are no more connected wireless nodes for which airtime needs to be estimated, then control passes to block B of FIG. 7C as described herein.

If at block 720, it is determined that the node required airtime is not greater than the node initial airtime, then at block 722, the node allocated airtime is set as equal to the node required airtime, according to certain embodiments. Next, at block 726, it is determined if the node allocated airtime is less than the node minimum airtime threshold. The node minimum airtime threshold is a predetermined value, according to certain embodiments. If it is determined that the node allocated airtime is not less than the node minimum airtime threshold, then control passes to block 730. Block 730 is previously described above. If it is determined that the node allocated airtime is less than the node minimum airtime threshold, then at block 728, the node allocated airtime is set as equal to node minimum airtime threshold, in order to avoid a zero value, according to certain embodiments.

Figure 7C:
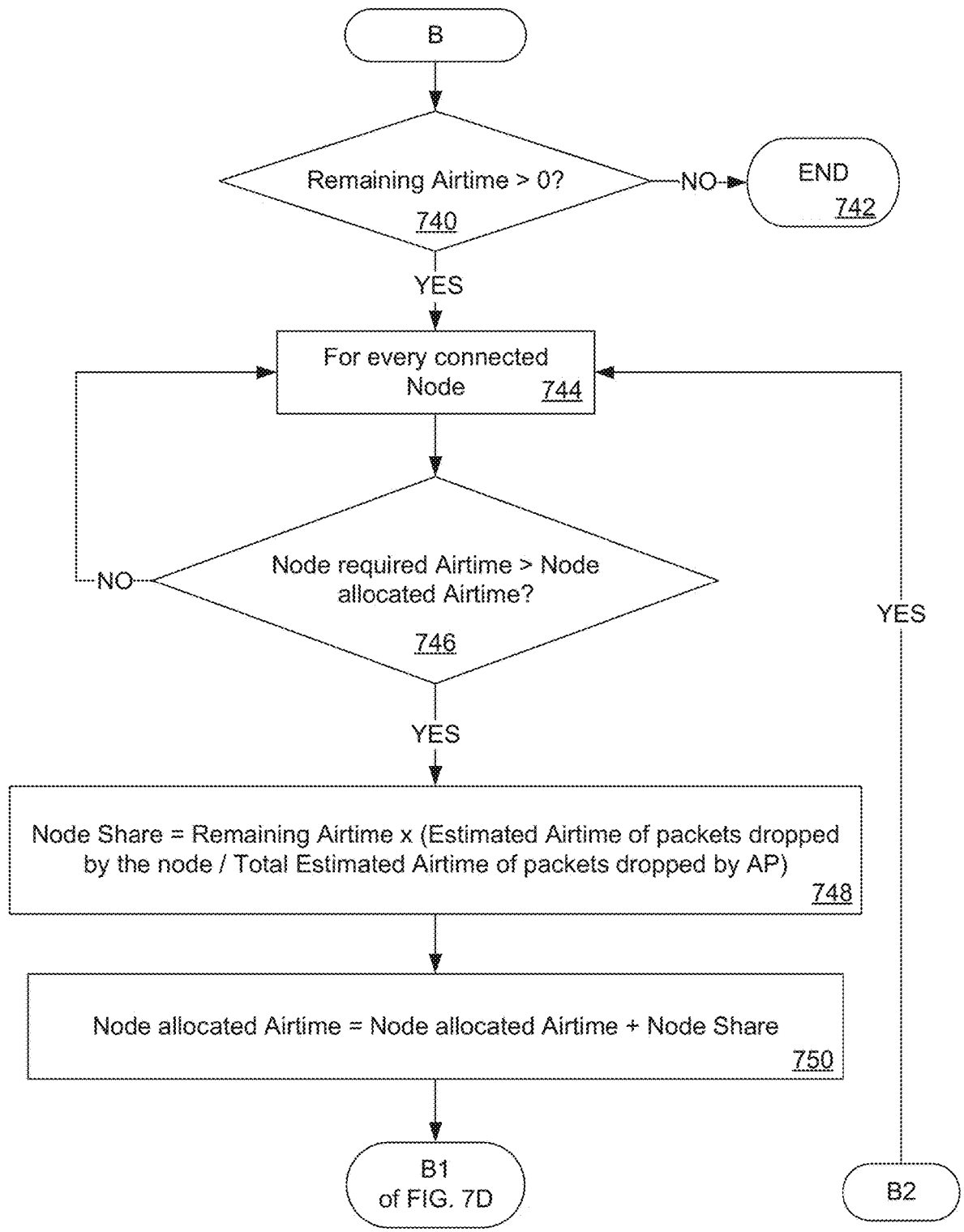

As shown in FIG. 7C, control passes from block B to block 740 where it is determined if the remaining airtime is greater than zero. If it is determined that the remaining airtime is not greater than zero then the process ends block 742. If it is determined that the remaining airtime is greater than zero, then each wireless node connected to the access point is considered at block 744. At block 746, for the connected wireless node under consideration at block 744, it is determined if the node required airtime is greater than the node allocated airtime. If at block 746, if it is determined that the node required airtime is greater than the node allocated airtime, then at block 748, the node share for the given node is calculated as: node share=remaining airtime X (estimated airtime of packets dropped by the given node/total estimated airtime of packets dropped by the given access point). At block 750, the airtime estimation engine calculates the node allocated airtime as: node allocated airtime=node allocated airtime+node share, according to certain embodiments. According to certain embodiments, the purpose of a "node share" is to share the unused airtime among connected wireless nodes that need more airtime. Next, control passes to block B1 of FIG. 7D. If at block 746, it is determined that the node required airtime is not greater than the node allocated airtime, then control passes back to block 744 where the airtime estimation moves to the next connected wireless node for consideration as described with reference to block 746.

Figure 7D:
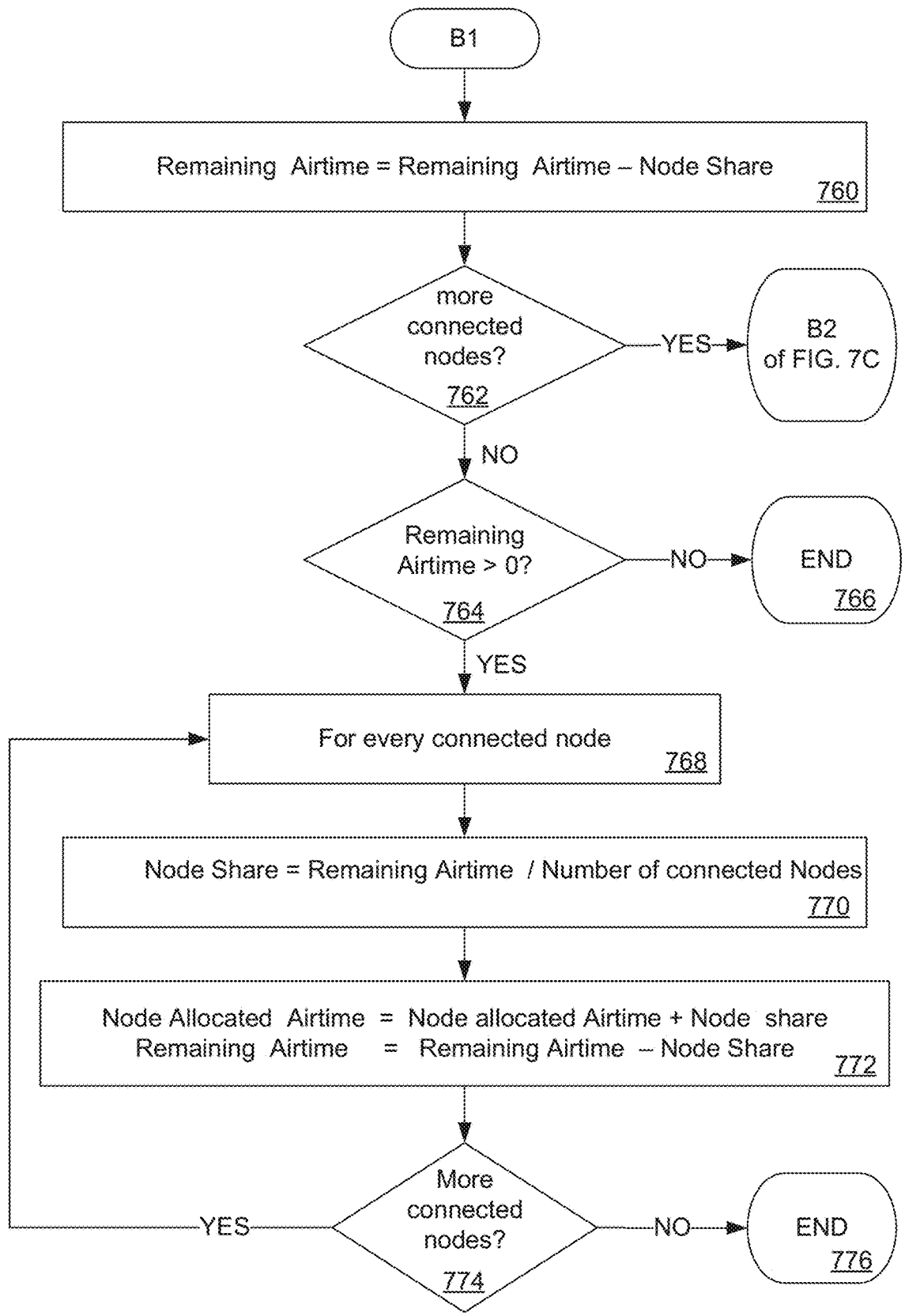

As shown at block B1 of FIG. 7D, control passed to block 760 where the airtime estimation engine calculates the remaining airtime for the given connected wireless node is calculated as: remaining airtime=remaining airtime—node share. At block 762, it is determined if there are more connected wireless nodes to be considered. If there are more connected wireless nodes to be considered, then control passes back to block B2 of FIG. 7C. As shown in FIG. 7C, from block B2, control passes to block 744 that is previously described herein with reference to FIG. 7C.

If at block 762, it is determined that there are no more connected wireless nodes to be considered, then at block 764, it is determined if the remaining airtime is greater than zero. If it is determined that the remaining airtime is not greater than zero, then the process ends at block 766. If however it is determined at block 764 that the remaining airtime is greater than zero, then at block 768 each connected wireless node is considered for calculating its node share at block 770 as: node share=remaining airtime/number of wireless nodes connected to the access point. At block 772, the airtime estimation engine sets the node allocated airtime for the given connected wireless node under consideration as: node allocated airtime=node allocated airtime+node share. Further at block 772, the airtime estimation engine sets the remaining airtime as: remaining airtime=remaining airtime—node share. At block 772, it is determined if there are more connected wireless nodes to be considered. If there are no more connected wireless nodes to be considered, then the process ends at block 776. If however, there are more connected wireless nodes to be considered, then control passes back to block 768.

Figure 8:
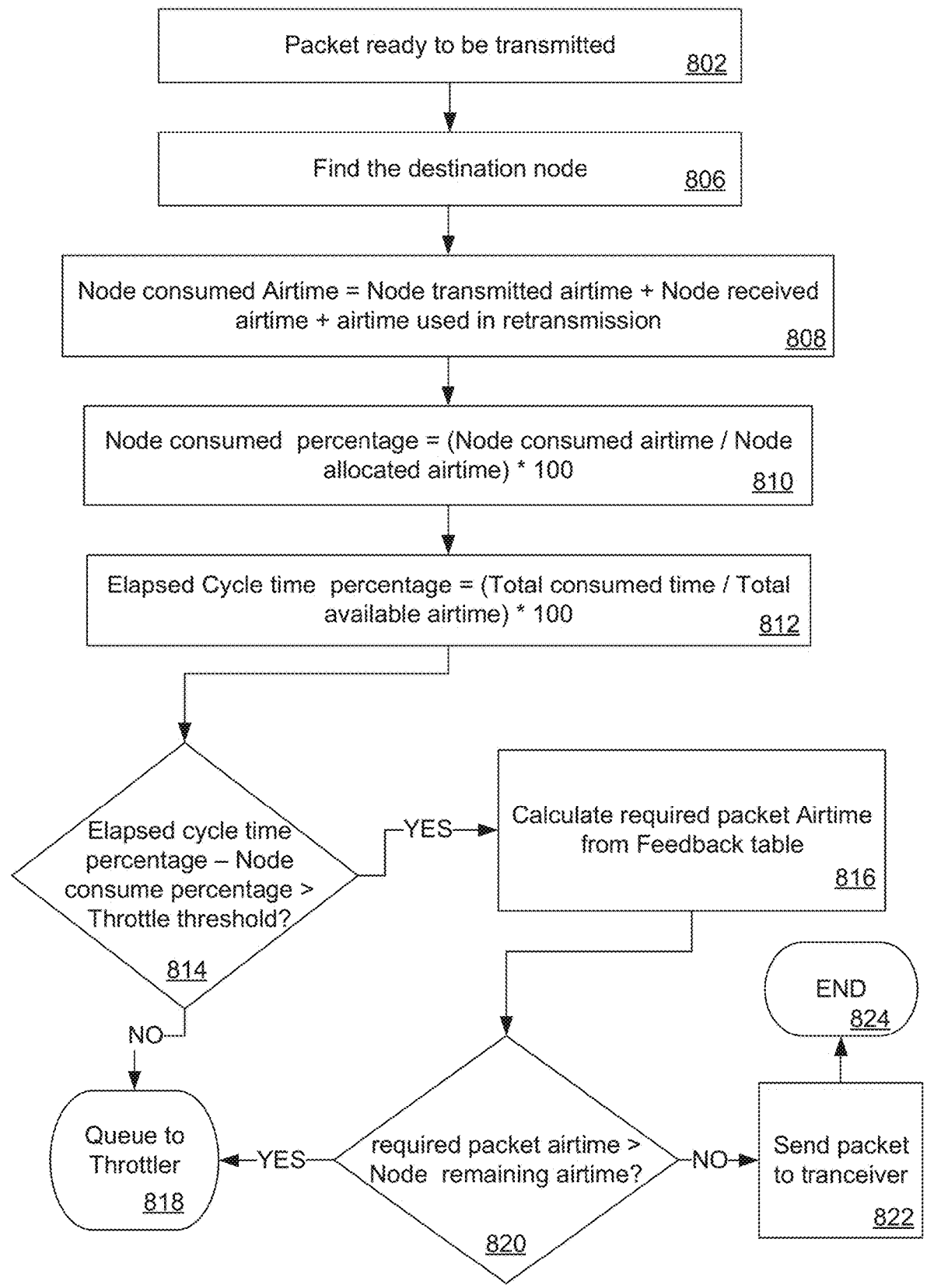
FIG. 8 is a high-level network flow chart showing aspects of an airtime distribution engine for wireless nodes client devices connected to wireless access point devices in a wireless network, according to certain embodiments.

FIG. 8 is a high-level network flow chart showing aspects of an airtime distribution engine for wireless nodes client devices connected to wireless access point devices in a wireless network, according to certain embodiments. When a data packet associated with a given connected wireless node is ready to be transmitted at block 802, the airtime distribution engine finds the destination wireless node at block 806. At block 808, the airtime distribution engine calculates the consumed airtime for the given destination wireless node found at block 806 as: destination node consumed airtime=airtime consumed by the destination node for transmitting packets+airtime consumed by the destination node for receiving packets+airtime consumed by the destination node due to re-transmissions. The airtime consumed by the destination node for transmitting packets, the airtime consumed by the destination node for receiving packets, and the airtime consumed by the destination node due to re-transmissions information can be obtained from the feedback table. At block 810, the airtime distribution engine calculates the destination node consumed airtime percentage as: destination node consumed airtime percentage=(destination node consumed airtime/destination node allocated airtime)×100. At block 812, the airtime distribution engine calculates the elapsed cycle time percentage as: elapsed cycle time percentage=(total airtime consumed by all the connected wireless nodes in the cycle/total available airtime)×100. At block 814, the airtime distribution engine determines if the elapsed cycle time percentage minus the destination node consumed airtime percentage is greater than the throttle threshold value. The throttle threshold value is a predetermined value according to certain embodiments. If it is determined that the elapsed cycle time percentage minus the destination node consumed airtime percentage is not greater than the throttle threshold value, then at block 818, the given data packet is queued to the throttler. However, if it is determined that the elapsed cycle time percentage minus the destination node consumed airtime percentage is greater than the throttle threshold value, then at block 816, the airtime distribution engine calculates the required airtime for transmitting the given data packet ("required packet airtime") based on information for the feedback table. According to certain embodiments, the required packet airtime is a function of packet length, selected data rate, previous retries for the selected data packet rate obtained from the feedback table. At block 820, the airtime distribution engine determines if the required airtime for transmitting the given data packet is greater than the destination node's remaining airtime. If it is determined that the required airtime for transmitting the given data packet is greater than the destination node's remaining airtime, then control passes to block 818 where the given data packet is queued to the throttler. However, if it is determined that the required airtime for transmitting the given data packet is not greater than the destination node's remaining airtime, then the data packet is sent to the wireless transceiver for transmission. The airtime distribution process ends at block 824.

Figure 9:
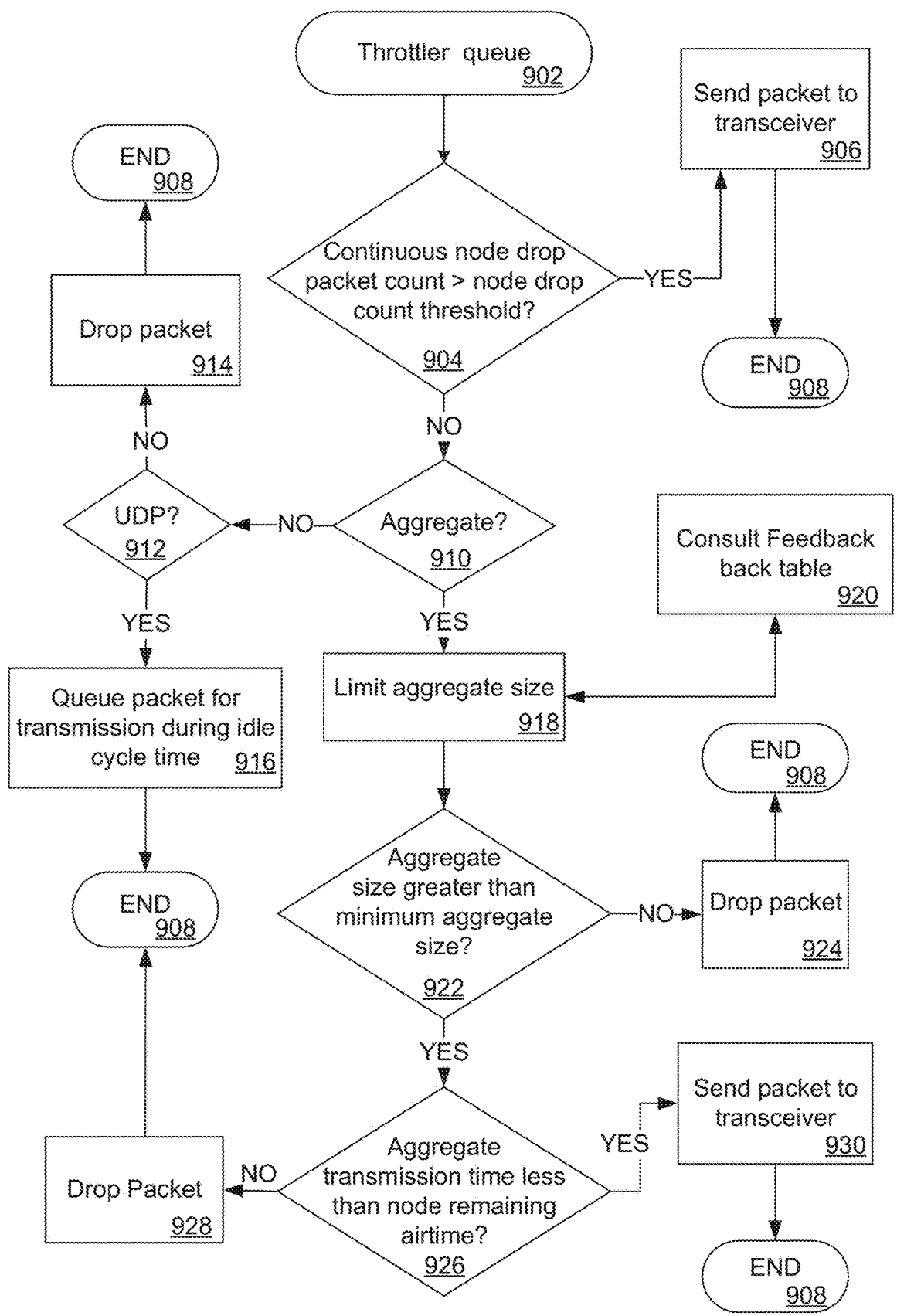
FIG. 9 is a high-level network flow chart showing aspects of a throttler for wireless nodes client devices connected to wireless access point devices in a wireless network, according to certain embodiments.

FIG. 9 is a high-level network flow chart showing aspects of a throttler for wireless nodes client devices connected to wireless access point devices in a wireless network, according to certain embodiments. In FIG. 9, block 902 operates on the next packet (current packet) in the throttler queue. At block 904, the throttler determines if the continuous dropped packet count of a given node associated with the current packet is greater than the dropped packet count threshold. According to certain embodiments, the dropped packet count threshold is a predetermined value. If it is determined that the continuous dropped packet count of the given node associated with the current packet is greater than the dropped packet count threshold, then the packet is sent to the wireless transceiver at block 906. However, if it is determined that the continuous dropped packet count of a given node associated with the current packet is not greater than the dropped packet count threshold, then at block 910, it is determined if the given current packet is an aggregate packet. If it is determined that the given current packet is an aggregate packet, then at block 918, the size of the aggregate packet is limited by consulting the feedback table at block 920. At block 922, it is determined if the size of the aggregate packet is greater than the minimum required aggregate size. If it is determined that the size of the aggregate packet is not greater than the minimum required aggregate size, then at block 924, the packet is dropped.

However, if it is determined that the size of the aggregate packet is greater than the minimum required aggregate size, then at block 926, it is determined if the transmission time for the aggregate packet is less than the remaining airtime of the destination node. If it is determined that the transmission time for the aggregate packet is less than the remaining airtime of the destination node then at block 930, the aggregate packet is sent to the wireless transceiver. However, if it is determined at block 926 that the transmission time for the aggregate packet is not less than the remaining airtime of the destination node, then at block 928, the aggregate packet is dropped.

If at block 910, it is determined that the current packet is not an aggregate packet, then at block 912, it is determined if the packet is a UDP packet. If it is determined that the packet is a UDP packet, then at block 916, the UDP packet is queued for transmission during the idle cycle time if there is an un-utilized airtime available at the end of cycle. According to certain embodiments, a decision may be made to drop the UDP packet if the number of packets queued thus far for the given connected wireless node exceeds a predetermined maximum value. When queuing each of the packets, the throttler will track the time required to transmit each of the packets based on the size of the packet, according to certain embodiments. As the time elapses in the current cycle, if the connected wireless nodes become idle (for example, there are no packets to be transmitted for any of the connected wireless nodes), then the throttler will transmit the queued UDP packets until one of the connected wireless nodes makes a transmission request. At the end of the cycle period, the packets remaining in the UDP queue will be dropped, according to certain embodiments.

However, if a block 912, it is determined that the packet is not a UDP packet (e.g., it is a TCP packet), then at block 914, the packet is dropped. The process ends at block 908.

At the end of each cycle time, the feedback engine provides feedback to the airtime estimation engine. The feedback information can include the number of packet dropped, the time take for transmission, the time wasted in retries and the time consumed for receiving the packets. According to certain embodiments, the feedback engine can be queried by the airtime distribution engine for the required airtime to transmit a packet.

According to certain embodiments, the airtime of a packet is computed at the completion of transmission of each packet. At the completion of transmission, the following information can be obtained from the access point hardware for computing airtime:

1. Size of the packet
2. Data Rate1, Number of tries1, RTS/CTS Flags
3. Data Rate2, Number of tries2, RTS/CTS Flags
4. Data Rate3, Number of tries3, RTS/CTS Flags
5. Data Rate4, Number of tries4, RTS/CTS Flags According to certain embodiments, the access point hardware decides the rate of transmission for packets associated with each wireless node. According to certain embodiments, the feedback engine builds a lookup table referred to as a feedback table. As a non-limiting example, the feedback table includes supported PHY layer statistics such as:

---

$RATE_1, RATE_2, \ldots, RATE_N$
$RATE_1$ TX PKTS, $RATE_2$ TX PKTS, $\ldots RATE_N$ TXPKTS
$RATE_1$ TX RETRIES, $\ldots, RATE_N$ TX RETRIES
Unused Airtime
Transmission Airtime
Receiving Airtime
Drop Airtime

---

TX = transmission, PKTS = packets.

Figure 10:
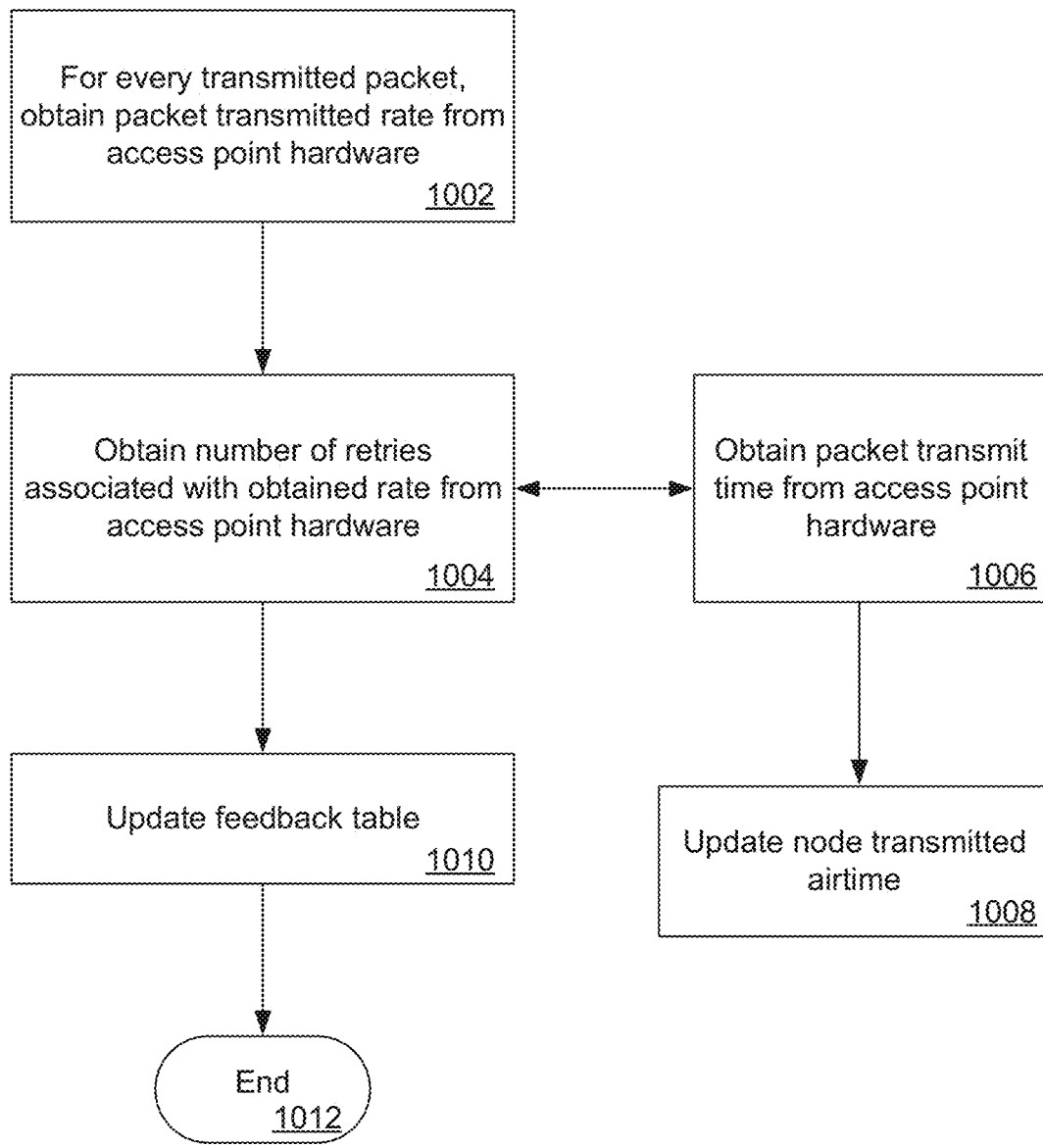
FIG. 10 is a high-level network flow chart showing aspects of a feedback engine for wireless nodes client devices connected to wireless access point devices in a wireless network, according to certain embodiments.

FIG. 10 is a high-level network flow chart showing aspects of a feedback engine for wireless client devices/nodes connected to wireless access point devices in a wireless network, according to certain embodiments. At block 1002 in FIG. 10, for each transmitted packet, the feedback engine obtains the rate of transmission information of the transmitted packet from the access point hardware. At block 1004, the feedback engine obtains the number of retries associated with the transmission rate information obtained at block 1002. At block 1006, the feedback engine obtains the packet transmit airtime from the access point hardware. At block 1008, the node transmitted airtime is updated by the feedback engine. At block 1010, the feedback table is updated by the feedback engine. The process ends at block 1012.

According to certain embodiments, a wireless communication system comprises an airtime estimation engine for determining a respective node allocated airtime in a cycle time period for a given wireless node connected to an access point in the wireless communication system and is based on comparing a required airtime for the given wireless node with an available airtime for the given wireless node in the wireless communication system. According to certain embodiments, the available time is a total available airtime in a cycle divided by a total number of connected wireless nodes in the wireless communication system. According to certain embodiments, such a system further comprises an airtime distribution engine for controlling the given wireless node's consumption of its node allocated airtime across the cycle time period and is based on comparing a consumed airtime percentage of the given wireless node with an elapsed cycle time percentage of the cycle time period.

According to certain embodiments, the wireless communication system further comprises a throttler engine for determining a packet type of each respective packet in a queue of the throttler engine. According to certain embodiments, the throttler engine queues the respective packet for transmission during idle cycle time if the packet type is determined to be a UDP type.

According to certain embodiments, the throttler engine limits packet size if the packet type of the respective packet is determined to be an aggregate type. According to certain embodiments, the throttler engine drops the respective packet if the packet type is determined to be a TCP type.

According to certain embodiments, the airtime distribution engine calculates a required packet airtime for a respective packet based on information from a feedback table. According to certain embodiments, the feedback engine obtains a respective packet transmission time.

According to certain embodiments, the wireless communication system further comprises a feedback engine for obtaining a respective packet transmission rate. According to certain embodiments, the feedback engine obtains a respective packet transmission time. According to certain embodiments, the feedback engine updates a feedback table.

Distributed Load Balancing for Access Points

According to certain embodiments, in high density wireless environments where there may be a large number of wireless client devices that are competing for access points, load balancing across access points in the wireless environment may be achieved using a cloud based, controller-less, distributed solution, according to certain embodiments.

According to certain embodiments, a distributed solution of load balancing across access points has a faster convergence rate than non-distributed solutions.

According to certain embodiments, a distributed solution of load balancing across access points obviates a single point of failure.

According to certain embodiments, a distributed solution of load balancing across access points reacts more efficiently to changes in the wireless environment.

According to certain embodiments, a distributed solution of load balancing across access points in a cloud based, controller-less wireless environment helps reduce capital expenditure, operational expenditure and reduces complexity of the wireless environment.

According to certain embodiments, a distributed solution of load balancing includes using at least of subset of the following:

a) Visibility of a wireless client device (also referred to as a "client") to one or more access points in the wireless environment;

b) Distance of the client from an access point:

c) Congestion in the channel associated with the access point;

d) CPU load of an access point;

e) Number of existing clients connected to an access point;

f) Received Signal Strength Indication ("RSSI") of the client as seen by an access point.

According to certain embodiments, when a client would like to connect to an access point, the client (also referred to as a "requesting client") sends, to access points that are nearby, a probe request to connect. According to certain embodiments, each access point that receives a probe request from the requesting client obtains information on the best access point for connecting to the requesting client.

According to certain embodiments, an access point decides to respond to the requesting client based on at least the information on the best access point for connecting to the requesting client. According to certain embodiments, an access point decides to respond to the requesting client based on one or more criteria from a set of predetermined criteria. According to certain embodiments, examples of the predetermined criteria can include but are not limited to: a channel congestion weighting factor, a number of connected clients weighting factor, a CPU weighting factor, an acceptance weight threshold.

According to certain embodiments, a load balancer maintains a list (that is associated with a given requesting client) of access points for ranking (also referred to as a "ranking list"). According to certain embodiments, the load balancer ranks the ranking list of access points as a function of a channel congestion, a CPU usage and number of connected clients of a given AP.

According to certain embodiments, the load balancer ranks APs in the ranking list in view of each AP's deviation from the worst case value for each parameter of a predetermined set of parameters.

Figure 11:
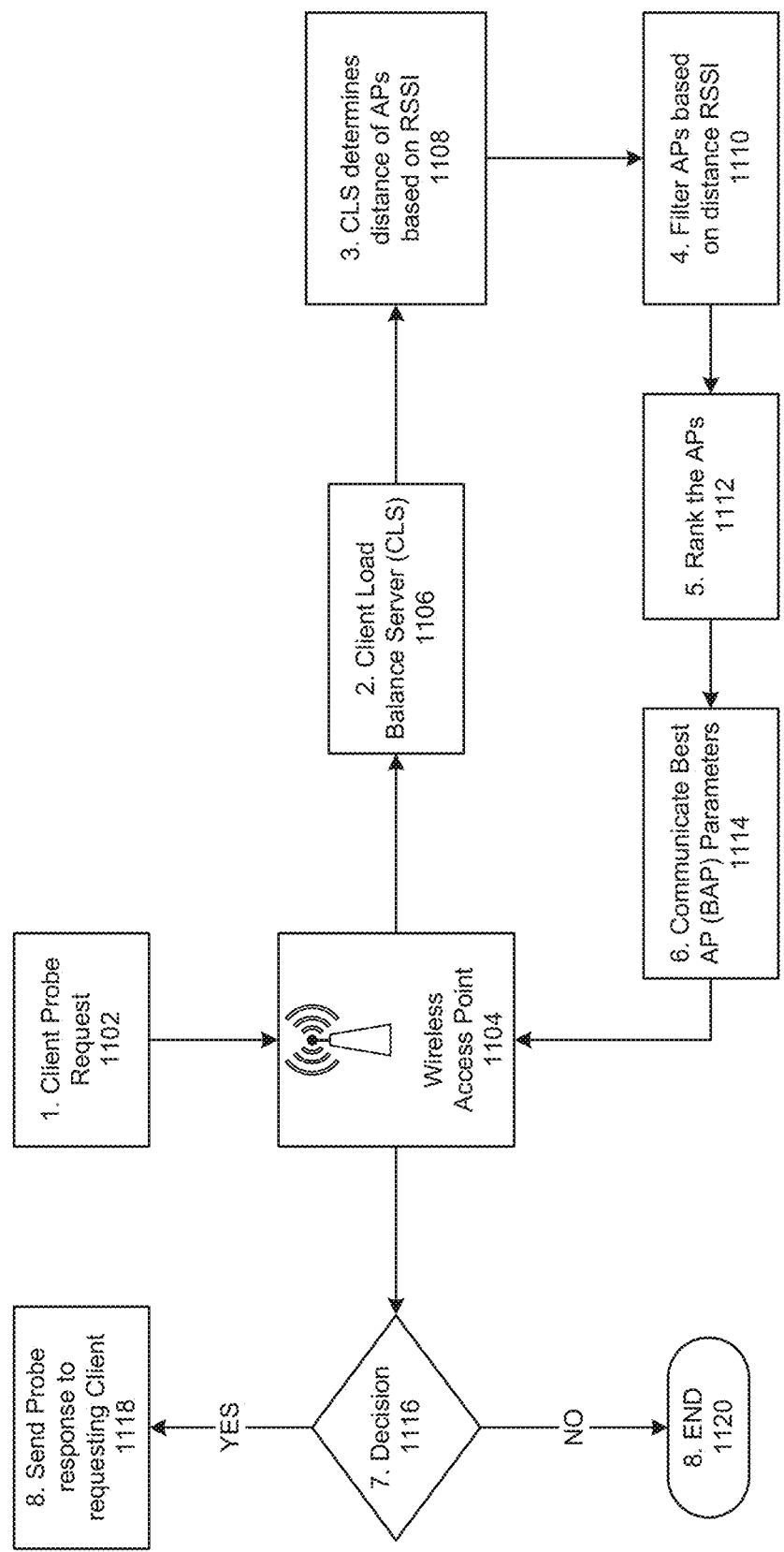
FIG. 11 is a high-level network diagram showing aspects of a distributed load balancing solution, according to certain embodiments.

FIG. 11 is a high-level network diagram showing aspects of a distributed load balancing solution, according to certain embodiments. In FIG. 11, a client 1102 (also referred to as "a requesting client") that wishes to connect to the best access point (or connect to a suitable access point) sends a request probe to each wireless access point that is nearby the requesting client, according to certain embodiments. Each access point that receives a probe request is also referred to as a "current AP".

In FIG. 11, according to certain embodiments, current AP 1104 communicates with a client load balance server 1106. Certain aspects of current AP 1104 are described in greater detail with reference to at least FIG. 12, herein.

In FIG. 11, according to certain embodiments, client load balance server 1106 determines (1108) the distance of the current AP 1104 from requesting client 1102 based on the received signal strength indication (RSSI) of requesting client 1102 as perceived by current AP 1104.

In FIG. 11, according to certain embodiments, client load balance server 1106 maintains a group of APs for each requesting client and determines if the current AP 1104 is to be added (1110), based on the RSSI of the requesting client 1102, to a "ranking list" associated with requesting client 1102. Certain aspects of the client load balance server 1106 are described in greater detail with reference to at least FIG. 13, herein.

In FIG. 11, according to certain embodiments, client load balance server 1106 ranks (1112) the APs in the ranking list associated with requesting client 1102 to determine the best AP ("BAP"). Certain aspects of the ranking process are described in greater detail with reference to at least FIG. 13, FIG. 14 and FIG. 15, herein.

In FIG. 11, according to certain embodiments, client load balance server 1106 communicates (1114) information on a set of parameters of the BAP to current AP 1104.

In FIG. 11, according to certain embodiments, a decision logic engine decides (1116) whether to send a response (1118) to the requesting client 1102 or not to send a response (1120) to the requesting client 1102. Certain aspects of such a decision process are described in greater detail with reference to at least FIG. 16, and FIG. 17, herein.

According to certain embodiments, the process described with reference to FIG. 11 occurs for each of the nearby APs that receive the request probe from the requesting client 1102.

Figure 12:
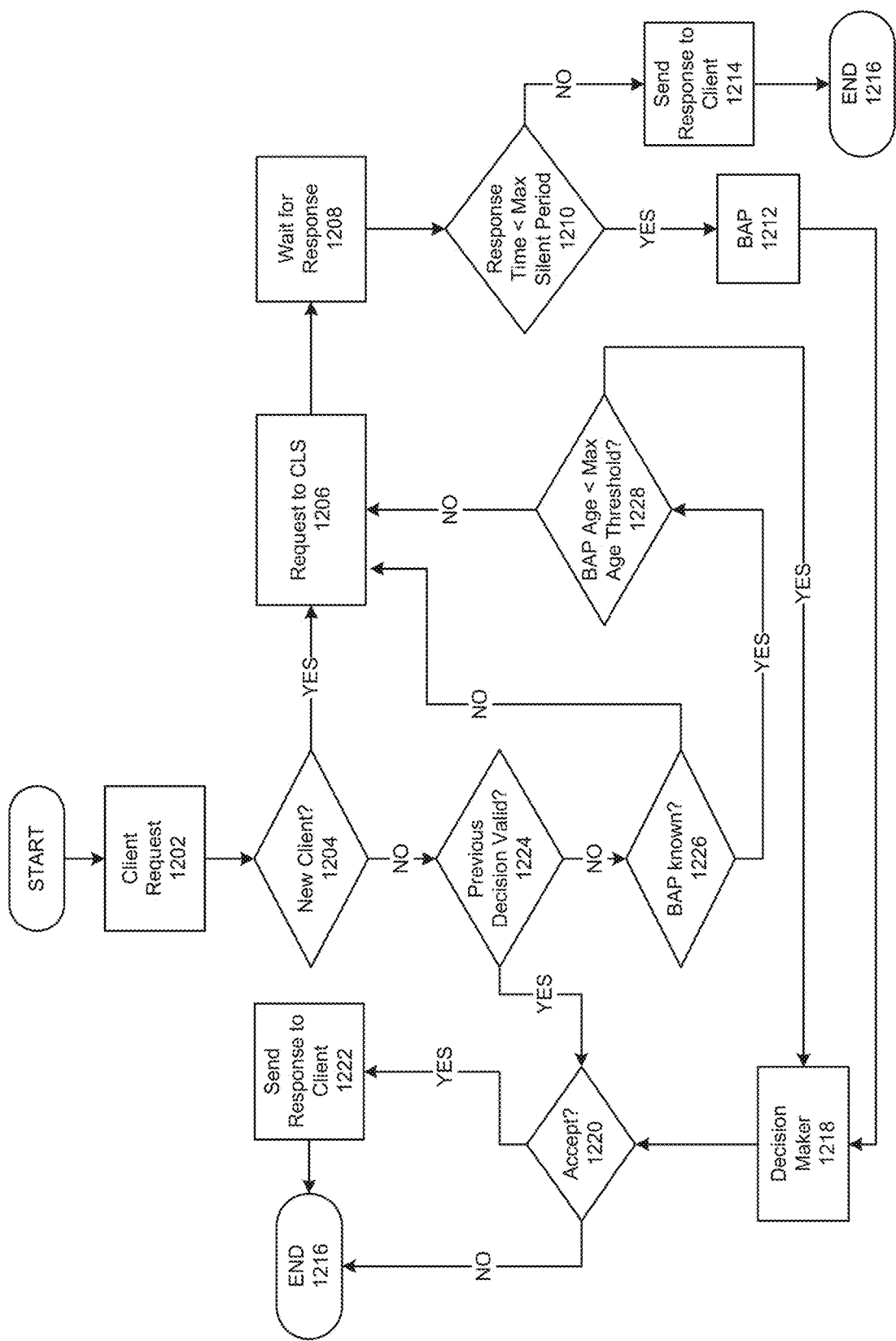
FIG. 12 is a high-level flow chart that illustrates some of the functions of a current AP that receives a probe request, according to certain embodiments.

FIG. 12 is a high-level flow chart that illustrates some of the functions of a current AP that receives a probe request, according to certain embodiments. In block 1202, the current AP receives a probe request from a requesting client.

At block 1204, the current AP determines if the requesting client is a new client. If the current AP determines that the requesting client is a new client, then at block 1206, the current AP sends a request to client load balance server (also referred to as a "CLS") to find the best access point (BAP) for the requesting client. According to certain embodiments, along with the request to find BAP, the current AP sends at least a subset of the following information to the CLS: 1) RSSI of the requesting client as seen by the current AP, 2) current channel congestion (or channel utilization, "CU") associated with the current AP, 3) current CPU utilization of the current AP, 4) the number of clients connected to the current AP, 5) media access control address (MAC address) of the current AP, and 6) media access control address (MAC address) of the requesting client.

At block 1208, the current AP waits for a response from the CLS for up to a predetermined maximum silent period, according to certain embodiments. At block 1210, it is determined if the time for receiving a response from the CLS is less than the predetermined maximum silent period.

According to certain embodiments, the CLS determines the identity of the BAP and related information (BAP parameters) in response to the current AP's request referred to at block 1206. According to certain embodiments, the determination of the identity of the BAP and related BAP parameters is described in greater detail with reference to at least FIGS. 13 and 14, herein.

If the time for receiving a response from the CLS is not less than the predetermined maximum silent period, then at block 1214, the current AP sends a response to the requesting client. However, if the time for receiving a response from the CLS is less than the predetermined maximum silent period, then at block 1212, the current AP waits for the information on the BAP and sends such information to a decision logic engine 1218. According to certain embodiments, the decision logic engine may be physically part of the current AP device. According to certain other embodiments, the decision logic engine may be remote from the current AP device. The manner in which the decision logic engine decides whether to respond to the requesting client is described in greater detail with respect to at least FIG. 16 and FIG. 17, herein.

At block 1220, the current AP receives a decision from the decision logic engine and determines whether the decision logic engine has decided to accept or reject the requesting client. If it is determined that the requesting client should be accepted, the current AP sends a response to the requesting client at block 1222. If it is determined that the requesting client is to be rejected, the current AP will not respond to the requesting client, according to certain embodiments.

According to certain embodiments, if at block 1204, the current AP determines that the requesting client is not a new client, then at block 1224, the current AP determines if the previous decision made by the decision logic engine is still valid based on how long ago the decision was made. For example, the previous decision remains valid if the age of the previous decision is less than a maximum decision age value.

If at block 1224 the current AP determines that the previous decision made by the decision logic engine is still valid, then control passes to block 1220 and block 1220 has been described above.

If at block 1224 the current AP determines that the previous decision made by the decision logic engine is not valid, then at block 1226, the current AP determines if the BAP is a known BAP. If the current AP determines that the BAP is not known, then control passes to block 1206 and block 1206 has been previously described above.

If the current AP determines that the BAP is a known BAP, then at block 1228, the current AP determines if the age of the BAP is less than a maximum age threshold. If the current AP determines that the age of the BAP is less than a maximum age threshold, then control passes to block 1218 so that the decision logic engine can determine whether to accept or reject the requesting client as previously described above. If however, the current AP determines that the age of the BAP is greater than the maximum age threshold, then control passes to block 1206 and block 1206 has been previously described above.

Figure 13:
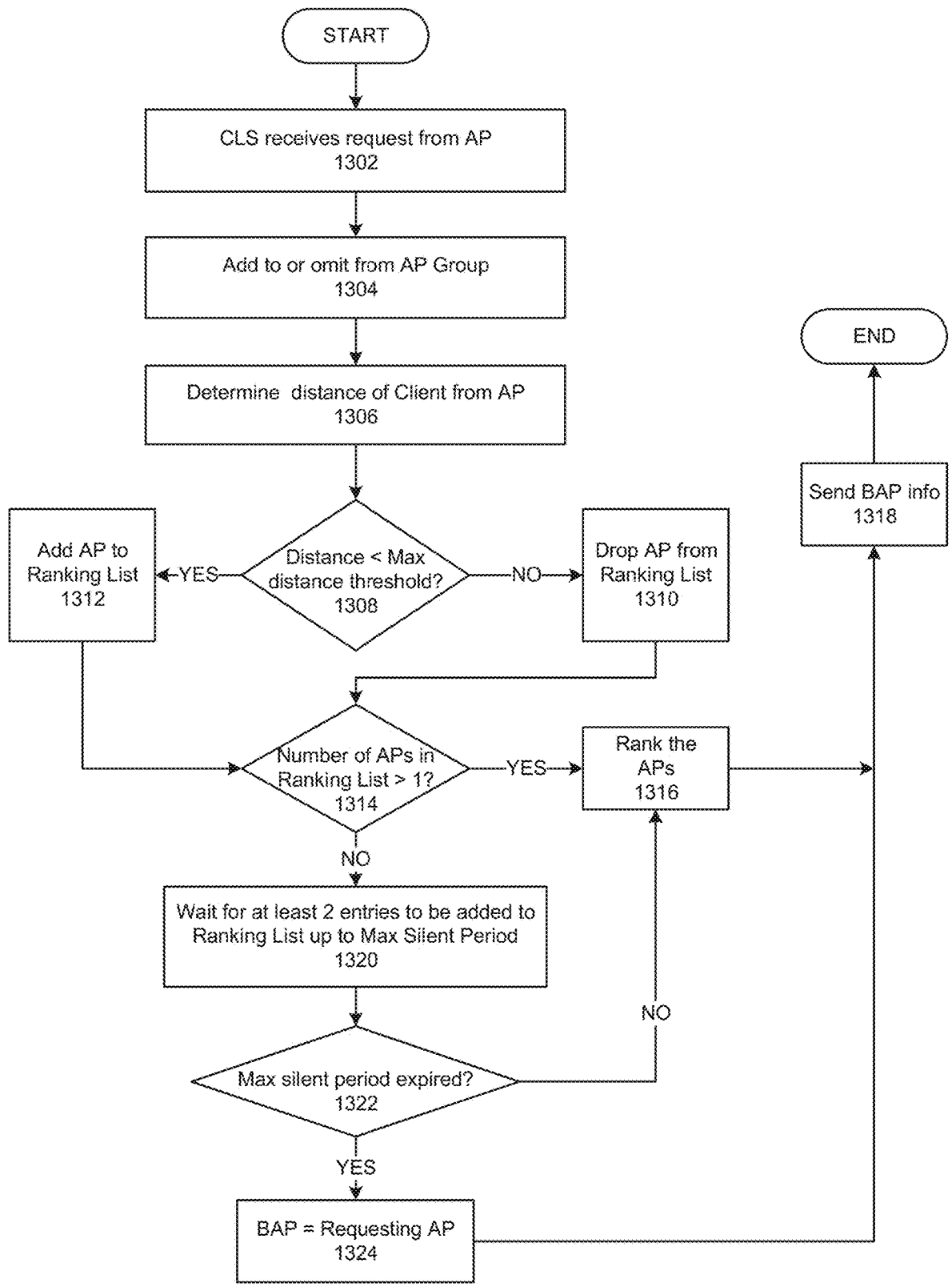
FIG. 13 is a high-level flow chart that illustrates some of the operations of the client load balance server, according to certain embodiments.

FIG. 13 is a high-level flow chart that illustrates some of the operations of the client load balance server (CLS). At block 1302, the CLS receives, from the current AP, the request to find the best access point (BAP) for the requesting client, as previously described with reference to at least FIG. 12 above. According to certain embodiments, along with the request to find the BAP, the CLS receives the following information from the current AP: 1) RSSI of the requesting client as seen by the current AP, 2) current channel congestion (or channel utilization percentage, "CU") associated with the current AP, 3) current CPU utilization percentage of the current AP, 4) the number of clients connected to the current AP, 5) media access control address (MAC address) of the current AP, and 6) media access control address (MAC address) of the requesting client.

According to certain embodiments, the CLS associates a group of APs with each client that is known to the CLS. Thus, when the CLS receives, from the current AP, the request to find the best access point (BAP) for the requesting client, the CLS adds, at block 1304, the current AP to the group of APs associated with the requesting client if the requesting client is previously known to the CLS. Further, at block 1304, if the requesting client is not previously known to the CLS, then the CLS creates a new group of APs for the requesting client, according to certain embodiments.

At block 1306, the CLS determines the distance of the requesting client from the current AP. As a non-limiting example, the distance can be determined using triangulation techniques.

At block 1308, the CLS determines if the distance of the requesting client from the current AP is less than a predetermined distance threshold. If the distance is less than the predetermined distance threshold, then at block 1312 the CLS adds the current AP to a ranking list associated with the requesting client. However, if the distance is not less than the predetermined distance threshold, then at block 1310, the CLS omits the current AP from the ranking list associated with the requesting client, according to certain embodiments.

At block 1314, the CLS determines if the number of APs in the ranking list is greater than 1. If the number of APs in the ranking list is greater than 1, then at block 1316, the CLS ranks the AP in the list. The manner of ranking is described in greater detail with reference to at least FIG. 14 and FIG. 15, herein, according to certain embodiments. Such a ranking identifies the best AP (BAP). At block 1318, the CLS sends information of the BAP, such as the identity of the BAP and other BAP parameters, to the current AP.

According to certain embodiments, the BAP information includes at least a subset of: 1) RSSI of the requesting client as seen by BAP, 2) channel utilization percentage associated with BAP, 3) BAP CPU utilization percentage, 4) the number of clients connected to BAP, 5) media access control address (MAC address) of BAP, and 6) media access control address (MAC address) of the requesting client.

If at block 1314, the CLS determines that the number of APs in the ranking list is not greater than 1, then at block 1320, the CLS waits for more APs to make request for BAPs. According to certain embodiments, the CLS waits for a period up to a predetermined maximum silent period.

At block 1322, the CLS determines if the predetermined maximum silent period has expired. If the predetermined maximum silent period has expired then at block 1324, the CLS designates the current AP as BAP and sends the BAP information to the current AP at block 1318 as previously described.

If the predetermined maximum silent period has not expired then controls passes to block 1316 and block 1316 is previously described above.

Figure 14:
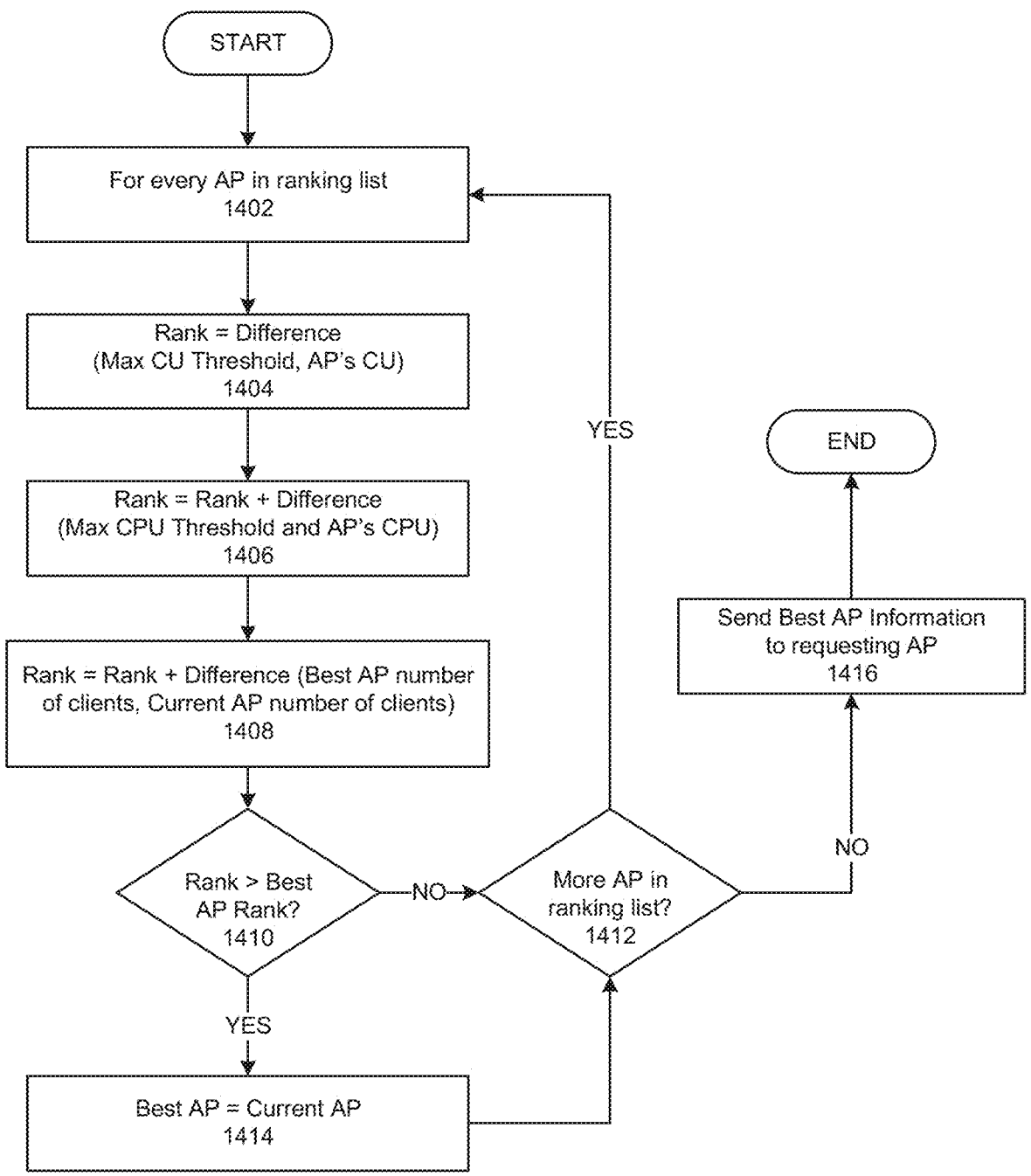
FIG. 14 is a high-level flow chart that illustrates some of the features of the ranking operation for ranking the APs, according to certain embodiments.

FIG. 14 is a high-level flow chart that illustrates some of the features of the ranking operation for ranking the APs, according to certain embodiments. The higher the AP's rank, the better the AP. At block 1402, the CLS considers each AP in the ranking list in view of each AP's deviation from the worst case value for each parameter of a predetermined set of parameters, as described with reference to blocks 1404, 1406, 1408 of FIG. 14.

At block 1404, for each current AP, the CLS determines the absolute value of the difference between channel utilization maximum threshold value and current AP channel utilization.

At block 1406, for each current AP, the CLS determines the absolute value of the difference between CPU usage max threshold value and current AP CPU usage adds it to the result of block 1404.

At block 1408, for each current AP, the CLS determines the absolute value of the difference between number of clients connected to the best AP and the number clients connected to the current AP and adds it to the result of block 1406. According to certain embodiments, the result of block 1408 is the rank of the respective current AP.

At block 1410, the CLS determines if the current AP has a rank that is greater than the rank of the best AP thus far. If the CLS determines that the current AP's rank is greater than the best rank, then at block 1414, the CLS designates the current AP as the BAP. Next control passes to block 1412 which is described below.

If at block 1410, the CLS determines that the current AP's rank is not greater than the rank of the best AP thus far, then at block 1412, the CLS determines if there are more APs in the rank list. If there are no more APs in the rank list, then at block 1416, the CLS sends the BAP information to the current AP. If there are more APs in the rank list then control passes back to block 1402 to determine the rank of the next current AP.

According to certain embodiments, the APs in the ranking list are ranked as follows based on empirical analysis:

$$\text{Rank} = (\Delta x/10) + ((2+(K/3)*2)*\text{CUcurr/CUmax})*(\Delta x/10)*(\hat{S}) + (\Delta y/10 + ((2+(L/3)*2)*\text{CPUcurr/CPUmax}) + \Delta y/10)*(\hat{S})(\text{RSSI}/30) + (\Delta z)*(\hat{S}), \text{for all } K > 0 \text{ and } L > 0$$

and where, $$(\Delta x) = \text{ABS } (80 - \text{CUrap})$$

Absolute value of the difference between channel utilization maximum threshold value and current AP channel utilization.

$$(\Delta y) = \text{ABS } (80 - \text{CPUrap})$$

Absolute value of the difference between CPU utilization max threshold value and current AP CPU utilization $$(\Delta z) = \text{ABS } (\text{NCbest} - \text{NCrap})$$

Absolute value of the difference between number of clients connected to the best AP and the number clients connected to the current AP.

And where, the sign factor $(\hat{S})$:

$(\hat{S}) = ((\text{comparing value} - \text{current value}) > 0)$, if current value is greater than the comparing value, the sign factor is true. If the sign factor is true, the calculated value will be negative. For example, if the current AP channel utilization is 83 and CUmax is 80, the sign factor will be true and will pull the results toward the negative scale.

$$K = (CUcurr - CUmax)$$

$$L = (CPUcurr - CPUmax)$$

Figure 15:
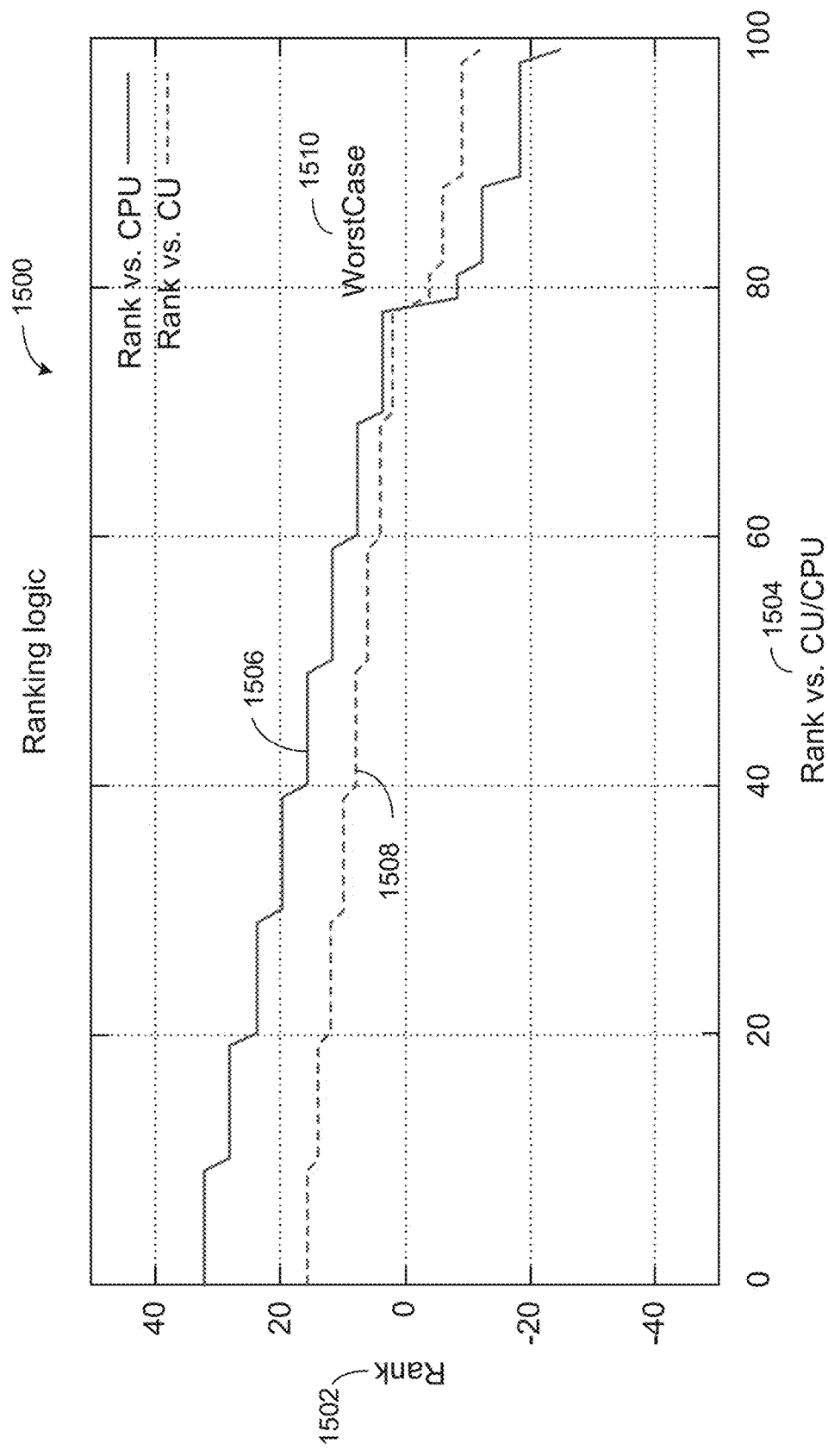
FIG. 15 is a graph that illustrates aspects of the ranking logic used for load balancing clients across APs in a wireless environment, according to certain embodiments.

FIG. 15 is a graph that illustrates aspects of the ranking logic used for load balancing clients across APs in a wireless environment, according to certain embodiments. Ranking logic graph 1500 of FIG. 15 shows Rank 1502 as the vertical axis and Rank vs channel utilization/CPU utilization (CU/CPU) 1504 as the horizontal axis. Graph 1500 also shows the rank vs CPU plot 1506 and the rank vs CU plot 1508. Graph 1500 also shows the worst case value 1510 based on the example above. To explain, the current APs are ranked based on the respective current AP's deviation from the worst case value for each parameter of a predetermined set of parameters, according to certain embodiments. As non-limiting examples, the parameters include channel utilization, CPU utilization and number of connected clients, according to certain embodiments.

Figure 16:
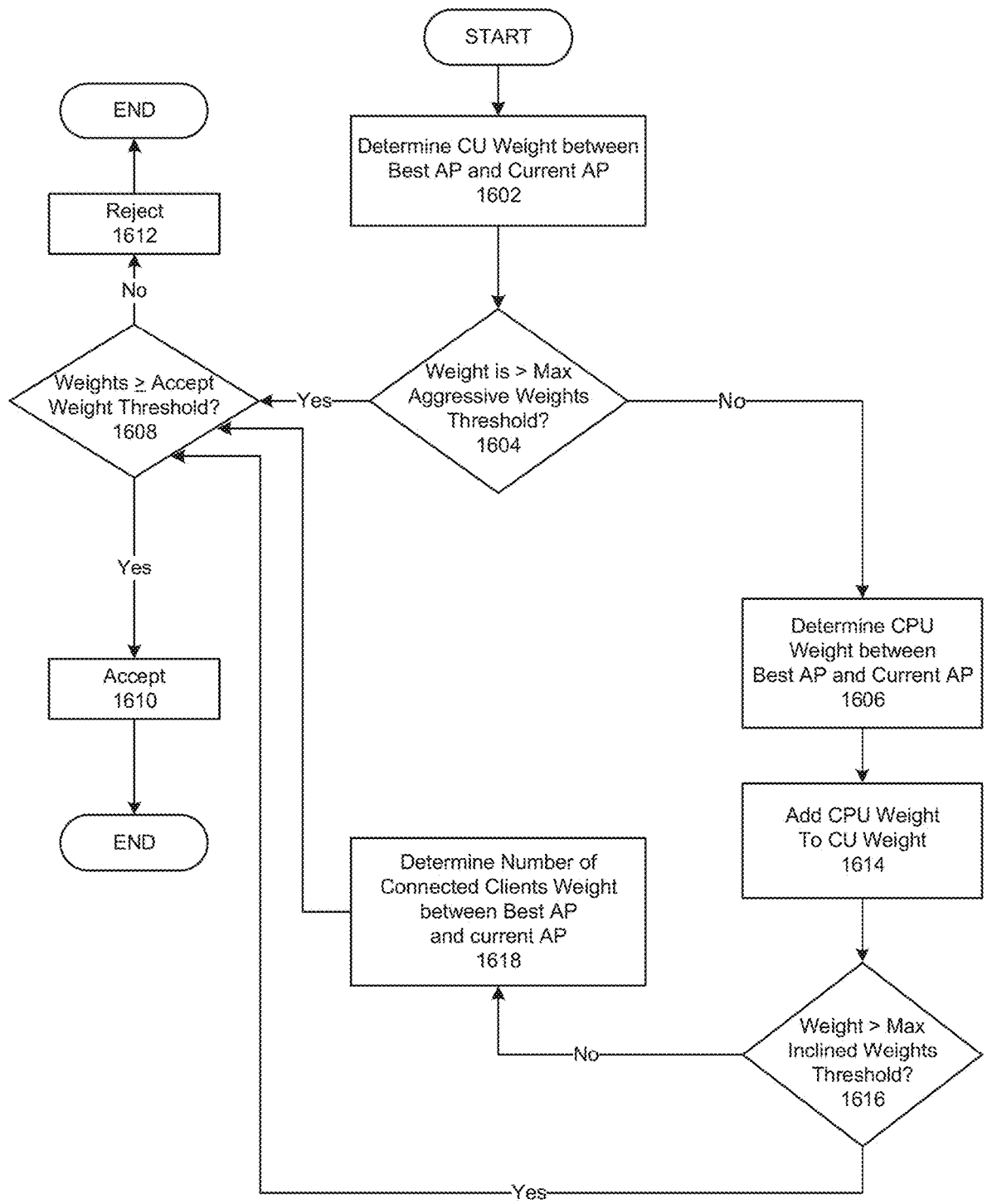
FIG. 16 is a high-level flow chart that illustrates some aspects of the decision logic engine used by the current AP, according to certain embodiments.

FIG. 16 is a high-level flow chart that illustrates some aspects of the decision logic engine used by the current AP (when the current AP receives the BAP information from the CLS) to decide whether to respond or ignore the requesting client that is requesting connection with the current AP.

According to certain embodiments, such a decision of the current AP can be any one of the following types: 1) aggressive, 2) inclined, and 3) fair. According to certain embodiments, when an aggressive decision is selected, the current AP responds immediately to the requesting client without further delay or further processing. When an inclined decision is selected, the current AP processes certain parameters as described in greater detail below. When a fair decision is selected, the current AP will attempt to divide the number of clients fairly across the current AP and the BAP.

At block 1602, the decision logic engine determines a channel utilization (CU) weight between BAP and the current AP. At block 1604, the decision logic engine determines if the weight determined at block 1602 is greater than a predetermined maximum aggressive weight threshold value. If the weight determined at block 1602 is greater than the maximum aggressive weight threshold value then, at block 1608, the decision logic engine determines if the weight determined at block 1602 is greater than or equal to a predetermined "accept weight" threshold value. If the weight determined at block 1602 is greater than or equal to the predetermined "accept" threshold value, then at block 1610 the decision status is set to "accept" (so that the current AP can send a response to the requesting client to allow the requesting client to connect to the current AP. However, if the weight determined at block 1602 is not greater than or equal to the predetermined "accept" threshold value, then at block 1612 the decision status is set to "reject" (so that the current AP can ignore the requesting client probe request).

Further, if at block 1604, the decision logic engine determines that the weight determined at block 1602 is not greater than the predetermined maximum aggressive weight threshold value, then at block 1606, the decision logic engine determines the CPU weight between the BAP and the current AP.

At block 1614, the decision logic engine adds the CPU weight to the CU weight, according to certain embodiments. At block 1616, the decision logic engine determines if the combined CPU and CU weight is greater than the maximum inclined weight threshold value. If the decision logic engine determines that the combined CPU and CU weight is greater than the maximum inclined weight threshold value, then control passes to block 1608. However, if combined CPU and CU weight is not greater than the maximum inclined weight threshold value, then at block 1618, the decision logic engine determines the "number-of-connected-clients" weight between the BAP and the current AP (this is the fair decision). Then at block 1608, the decision logic engine determines if the weight determined at block 1618 is greater than or equal to the predetermined "accept" threshold value. If the weight determined at block 1618 is greater than or equal to a predetermined "accept" threshold value, then at block 1610 the decision status is set to "accept" (so that the current AP can send a response to the requesting client to allow the requesting client to connect to the current AP. However, if the weight determined at block 1618 is not greater than or equal to the predetermined "accept" threshold value, then at block 1612 the decision status is set to "reject" (so that the current AP can ignore the requesting client probe request).

According to certain embodiments, the weight determination for each of the parameters (CU, CPU and Number of connected clients) is as follows and is based on empirical analysis.

CU Weight Determination $$\text{Weight} = P + \text{Weight} + ((\Delta x/10 + ((2 + (K/3)*2)*b/m)) + (((2 + (L/3)*2)*a/m) + \Delta x/10))*(\hat{S})$$

for all $a > i \| b > i \| \Delta x > 20$ and for all $K > 0$ and $L > 0$

The Weight will be non-zero if and only if a or b are greater than the Minimum channel utilization threshold I, (for example, i=30) or $\Delta x > 20$, according to certain embodiments.

where,

P=Parameter priority

P can be either negative or positive or zero. P can be used either to increase or decrease the priority of a given parameter. The higher the value of P, the higher the priority. Default value of P is 1. The value P can be changed by the user. The value of P is unique for each parameter, according to certain embodiments.

m=Maximum threshold value of the CU a=Current AP channel utilization b=Best AP channel utilization i=Minimum CU threshold K=(b−m)

L=(a−m)

$\Delta x$=ABS (a−b), which is the absolute value of the difference between current AP channel utilization and Best AP channel utilization.

$(\hat{S})$−Sign factor=((b−a)>0), if current CU value is greater than the Best AP CU value the sign factor will be true. If the sign factor is true the calculated value will be negative. For example, if Current AP CU is 33 and Best AP CU is 30, the sign factor will be true.

CPU Weight Determination $$\text{Weight} = P + \text{Weight} + ((\Delta x/10 + ((2 + (K/3)*2)*b/m)) + (((2 + (L/3)*2)*a/m) + \Delta x/10))*(\hat{S})$$

for all $a > i \| b > i \| \Delta x > 20$ and for all $K > 0$ and $L > 0$

The input weight will be always a non-zero value in this equation.

P=Parameter priority

P can be either negative or positive or zero. P can be used either to increase or decrease the priority of a given parameter. The higher the value of P, the higher the priority. Default value of P is 1. The value P can be changed by the user. The value of P is unique for each parameter, according to certain embodiments.

where,
m=Max threshold value of the CPU utilization
a=Current AP CPU utilization
b=Best AP CPU utilization
i=minimum CPU threshold
P=Priority
Δx=ABS (a−b) (Absolute difference between current AP CPU utilization and Best AP CPU utilization).
K=(b−m)
L=(a−m)
(Ŝ)−Sign factor=((b−a)>0), if current CPU utilization value is greater than the best AP CPU utilization value, then the sign factor will be true. If the sign factor is true, the calculated value will be negative. For example if Current AP CPU is 33 and Best AP CPU is 30, the sign factor will be true.

Number of Connected Clients Weight Determination

Weight=$P$+Weight+$\Delta x/S*(\hat{S})+(\Delta RSSI/30)$

The scaling parameter (S) value will change based on the weight calculated from the previous equations used by parameters CU and CPU.

If the input weight<3
S=1
If the input weight>3
S=2
If the input weight>=5
S=3
P=Parameter priority P can be either negative or positive or zero. P can be used either to increase or decrease the priority of a given parameter. The higher the value of P, the higher the priority. Default value of P is 1. The value P can be changed by the user. The value of P is unique for each parameter, according to certain embodiments.

where,
S=Scale
a=Current AP number of connected clients
b=Best AP number of connected clients
P=Priority
Δx=ABS (a−b) (Absolute difference between current AP connected clients and Best AP connected clients)
ΔRSSI=(a−b) (A positive difference between current AP RSSI and Best AP RSSI)
(Ŝ)−Sign factor=((b−a)>0), if current AP number of connected clients value is greater than the best AP number of connected clients value, then the sign factor will be true. If the sign factor is true, the calculated value will be negative. For example if Current AP number of connected clients is 33 and Best AP number of connected clients is 30, the sign factor will be true.

Figure 17:
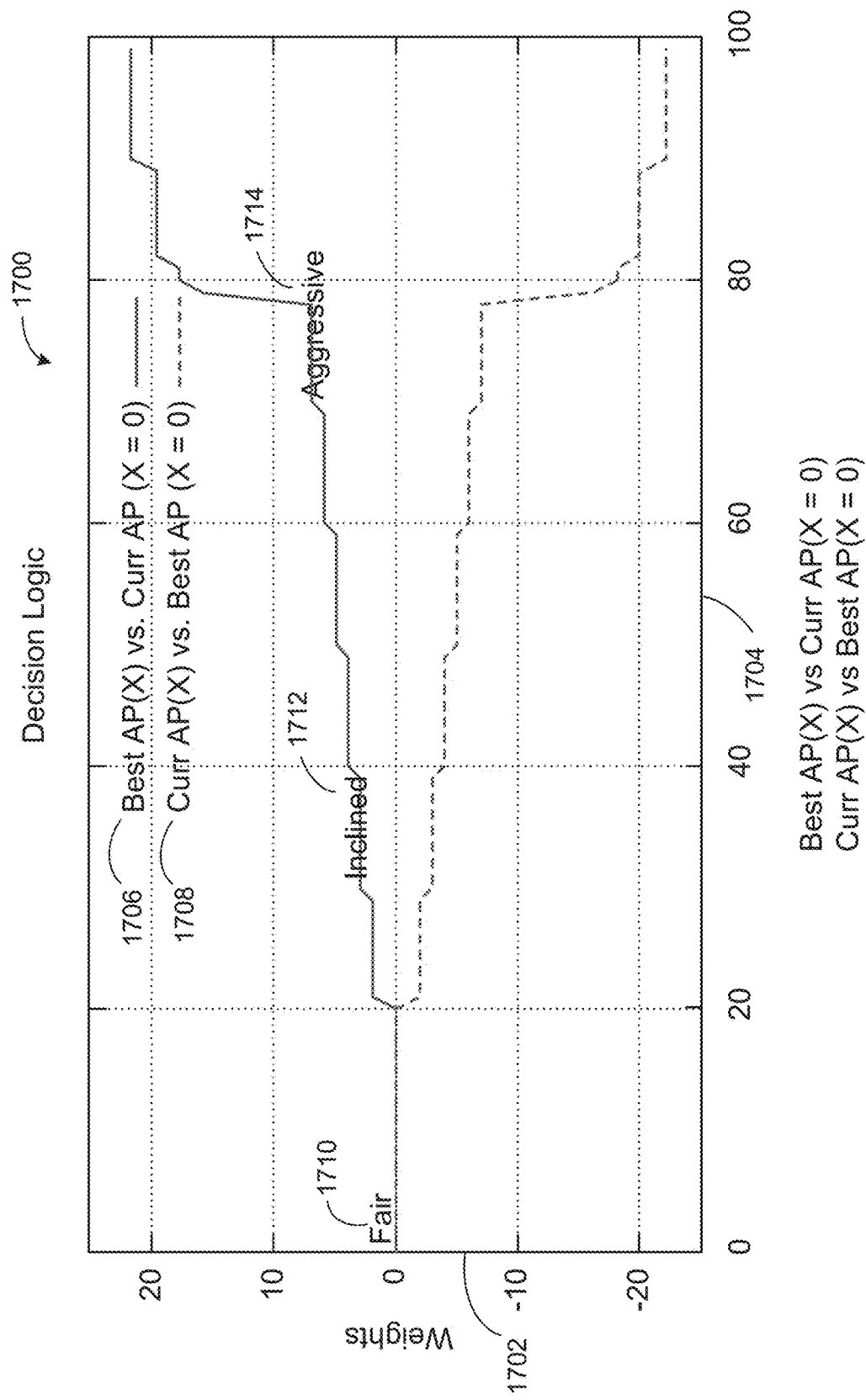
FIG. 17 is a graph that illustrates aspects of the decision logic used for load balancing clients across APs in a wireless environment, according to certain embodiments.

FIG. 17 is a graph that illustrates aspects of the decision logic used for load balancing clients across APs in a wireless environment, according to certain embodiments. Decision logic graph 1700 of FIG. 17 shows Weights 1702 as the vertical axis and BAP (x) vs Curr AP (x=0) 1704 as the horizontal axis. Graph 1700 also shows the BAP (x) vs Curr AP (x=0) plot 1706 and the Curr AP vs BAP (x=0) plot 1708. Graph 1500 also shows the worst case. Graph 1700 also shows the Fair 1710, Inclined 1712, and Aggressive 1714 decision logic.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

The invention claimed is:

1. A wireless access point (AP) device, comprising:
a wireless local area network (WLAN) chipset including a dedicated network processor configured to enable access by wireless client devices to a network;
a central processing unit (CPU) configured to execute one or more mobile application services engine (MASE) applications installed within each container of one or more containers, wherein each container of the one or more containers is configured to run the one or more MASE applications associated with an application group for the wireless AP device, wherein each MASE application of the one or more MASE applications is configured to execute from within a respective container of the MASE application a set of access point services for the wireless AP device, wherein a deployment of each MASE application of the one or more MASE applications is managed remotely using a cloud-based network management system (NMS), and wherein the cloud-based NMS remotely monitors activities and status of each MASE application of the one or more MASE applications;
a memory storing the one or more containers and the one or more MASE applications; and
an application manager application configured to monitor the one or more MASE applications during execution within each container of the one or more containers.

2. The wireless access point (AP) device of claim 1, further comprising a container file system configured to execute within a particular container of the one or more containers, wherein the particular container of the one or more containers is confined to pre-allocated segregated disk space within a file system of the wireless access point (AP) device.

3. The wireless access point (AP) device of claim 2, wherein the container file system prevents a particular MASE application of the one or more MASE applications being executed within the particular container of the one or more containers from accessing disk space outside the pre-allocated segregated disk space within the file system of the wireless access point (AP) device.

4. The wireless access point (AP) device of claim 2, wherein the container file system prevents a particular MASE application of the one or more MASE applications being executed within the particular container of the one or more containers from writing to disk space outside the pre-allocated segregated disk space within the file system of the wireless access point (AP) device.

5. The wireless access point (AP) device of claim 4, wherein the container file system allows the particular MASE application of the one or more MASE applications being executed within the particular container of the one or more containers to read from disk space outside the pre-allocated segregated disk space within the file system of the wireless access point (AP) device.

6. The wireless access point (AP) device of claim 1, further comprising a plurality of application services accessible by each MASE application of the one or more MASE applications via a MASE application programming interface (API).

7. The wireless access point (AP) device of claim 6, wherein the plurality of application services include Hyper Text Transfer Protocol (HTTP) proxy services.

8. The wireless access point (AP) device of claim 6, wherein the plurality of application services include fast common gateway interface (FCGI) web hosting services.

9. The wireless access point (AP) device of claim 6, wherein the plurality of application services include deep packet inspection (DPI) services.

10. The wireless access point (AP) device of claim 1, wherein a particular MASE application of the one or more MASE applications includes a configuration file.

11. The wireless access point (AP) device of claim 1, wherein a particular MASE application of the one or more MASE applications includes a library.

12. The wireless access point (AP) device of claim 1, wherein a particular MASE application of the one or more MASE applications includes an application generated by a third-party entity.

13. The wireless access point (AP) device of claim 1, wherein a particular MASE application of the one or more MASE applications is selected from a set of MASE applications available for deployment from the cloud-based NMS.

14. The wireless access point (AP) device of claim 1, wherein a set of MASE applications available for deployment includes public applications and only a subset of private applications.

15. The wireless access point (AP) device of claim 1, wherein the cloud-based NMS is configured to monitor a particular MASE application of the one or more MASE applications to ensure that the particular MASE application of the one or more MASE applications adheres to prescribed polices.

16. The wireless access point (AP) device of claim 1, wherein a particular MASE application of the one or more MASE applications is a Linux application configured to be executed within a Linux container.

\* \* \* \* \*